US009993947B2

(12) United States Patent
Hansen

(10) Patent No.: US 9,993,947 B2
(45) Date of Patent: Jun. 12, 2018

(54) FABRICATION OF STIFFENED COMPOSITE PANELS

(71) Applicant: The Boeing Company, Chicago, IL (US)

(72) Inventor: Martin Wayne Hansen, Puyallup, WA (US)

(73) Assignee: THE BOEING COMPANY, Chicago, IL (US)

(*) Notice: Subject to any disclaimer, the term of this patent is extended or adjusted under 35 U.S.C. 154(b) by 131 days.

(21) Appl. No.: 15/228,973

(22) Filed: Aug. 4, 2016

(65) Prior Publication Data
US 2016/0339605 A1 Nov. 24, 2016

Related U.S. Application Data

(62) Division of application No. 13/758,505, filed on Feb. 4, 2013, now Pat. No. 9,409,348.

(51) Int. Cl.
| B29C 65/00 | (2006.01) |
| B32B 37/00 | (2006.01) |
| B29C 33/30 | (2006.01) |
| B29C 70/30 | (2006.01) |
| B29C 70/34 | (2006.01) |
| B29L 31/30 | (2006.01) |

(52) U.S. Cl.
CPC .......... *B29C 33/301* (2013.01); *B29C 33/307* (2013.01); *B29C 70/30* (2013.01); *B29C 70/342* (2013.01); *B29L 2031/3085* (2013.01)

(58) Field of Classification Search
CPC combination set(s) only.
See application file for complete search history.

(56) References Cited

U.S. PATENT DOCUMENTS

| 4,009,067 | A | * | 2/1977 | Rogers .................... B29C 51/16 |
| | | | | 156/245 |
| 5,538,589 | A | | 7/1996 | Jensen et al. |
| 6,814,916 | B2 | | 11/2004 | Willden et al. |
| 7,118,370 | B2 | | 10/2006 | Willden et al. |
| 7,270,722 | B2 | | 9/2007 | Navas et al. |

(Continued)

FOREIGN PATENT DOCUMENTS

| EP | 2561979 A2 | 2/2013 |
| EP | 2604405 A1 | 6/2013 |

OTHER PUBLICATIONS

Office Action, dated Jun. 5, 2015, regarding U.S. Appl. No. 13/758,505, 18 pages.

(Continued)

*Primary Examiner* — Michael N Orlando
*Assistant Examiner* — Matthew Hoover
(74) *Attorney, Agent, or Firm* — Yee & Associates, P.C.

(57) ABSTRACT

A stiffened composite panel is fabricated using modular tooling. Composite pre-preg is laid up and formed over forming block modules each of which is assembled by co-linearly arranging a plurality of forming block segments. The formed stiffeners are respectively transferred to individual cure tool modules that are assembled by co-linearly arranging a plurality of cure tool module segments. The stiffeners are assembled by arranging the cure tool modules side-by-side, and a composite skin is placed on the assembled stiffeners. The panel is vacuum bagged using a segmented vacuum bag.

21 Claims, 26 Drawing Sheets

(56) References Cited

U.S. PATENT DOCUMENTS

| | | | |
|---|---|---|---|
| 7,464,508 B2* | 12/2008 | Fournie | B29C 70/345 |
| | | | 52/309.1 |
| 9,409,348 B2 | 8/2016 | Hansen | |
| 2008/0014453 A1 | 1/2008 | Levesque et al. | |
| 2009/0320292 A1 | 12/2009 | Brennan et al. | |
| 2010/0102482 A1* | 4/2010 | Jones | B29C 33/307 |
| | | | 264/320 |
| 2014/0374013 A1 | 12/2014 | Hansen | |

OTHER PUBLICATIONS

Final Office Action, dated Nov. 16, 2015, regarding U.S. Appl. No. 13/758,505, 20 pages.
Notice of Allowance, dated Apr. 8, 2016, regarding U.S. Appl. No. 13/758,505, 11 pages.
Extended European Search Report, dated Aug. 24, 2015, regarding Application No. EP14193767.2, 7 pages.

* cited by examiner

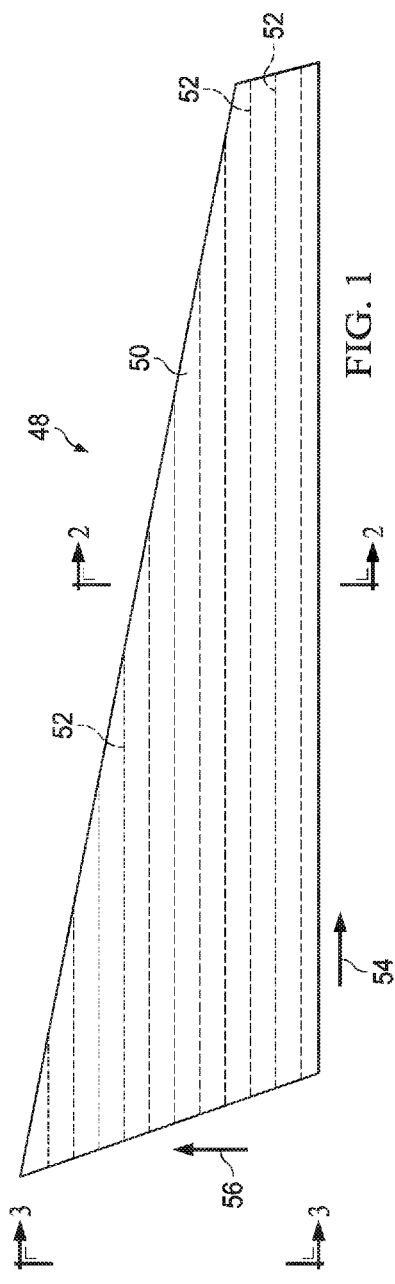
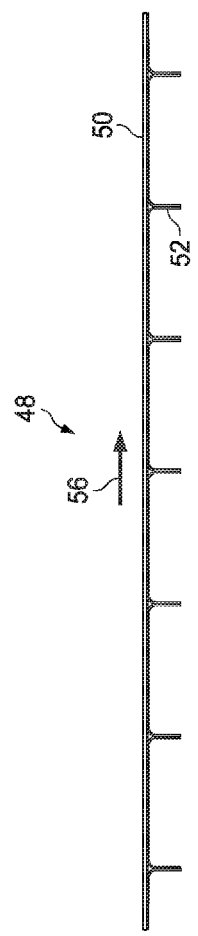
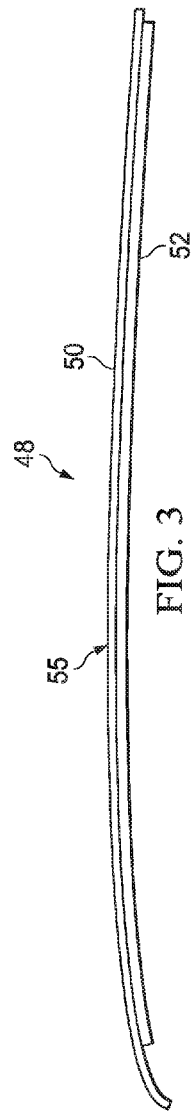
FIG. 1
FIG. 2
FIG. 3

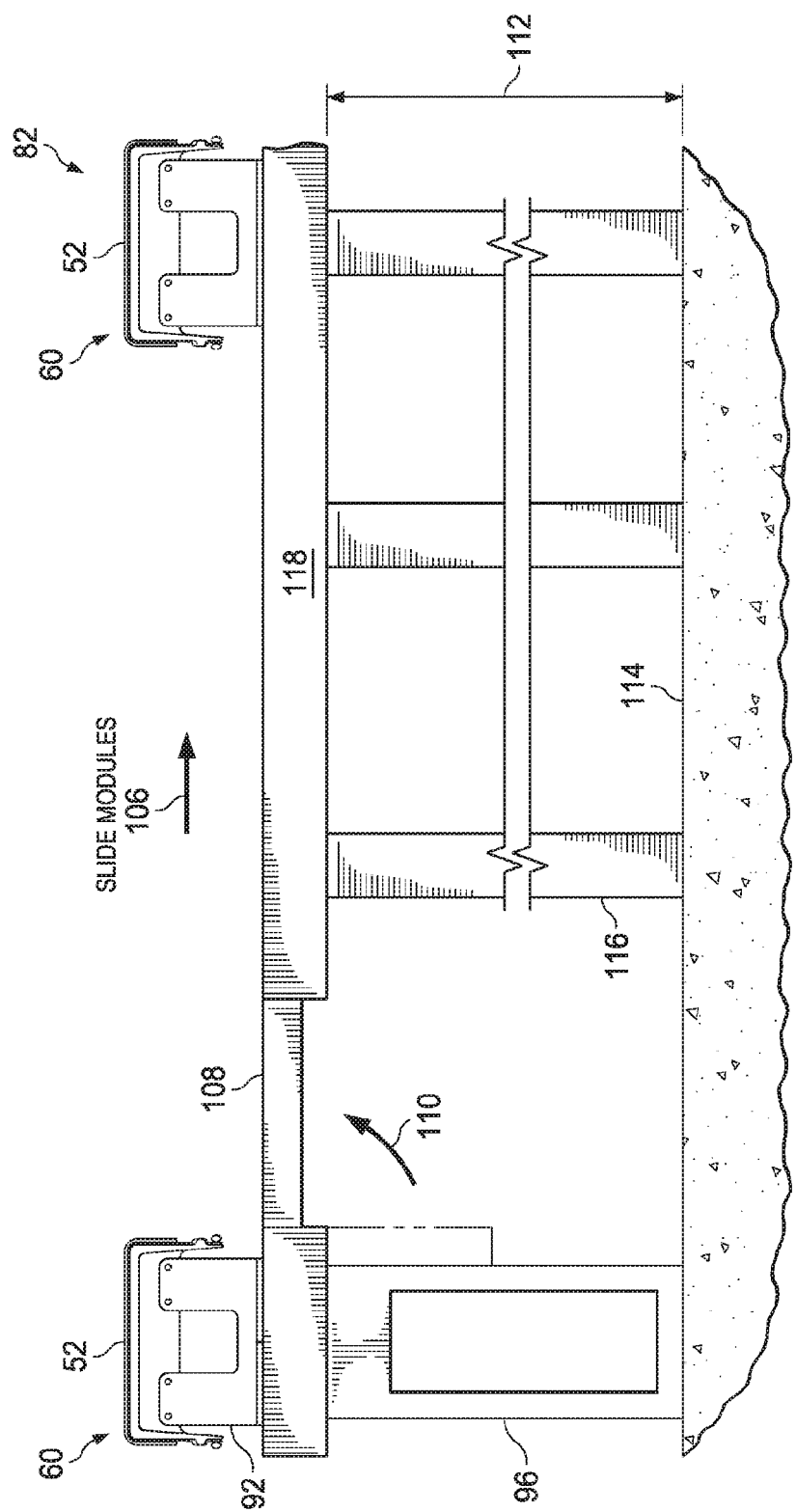

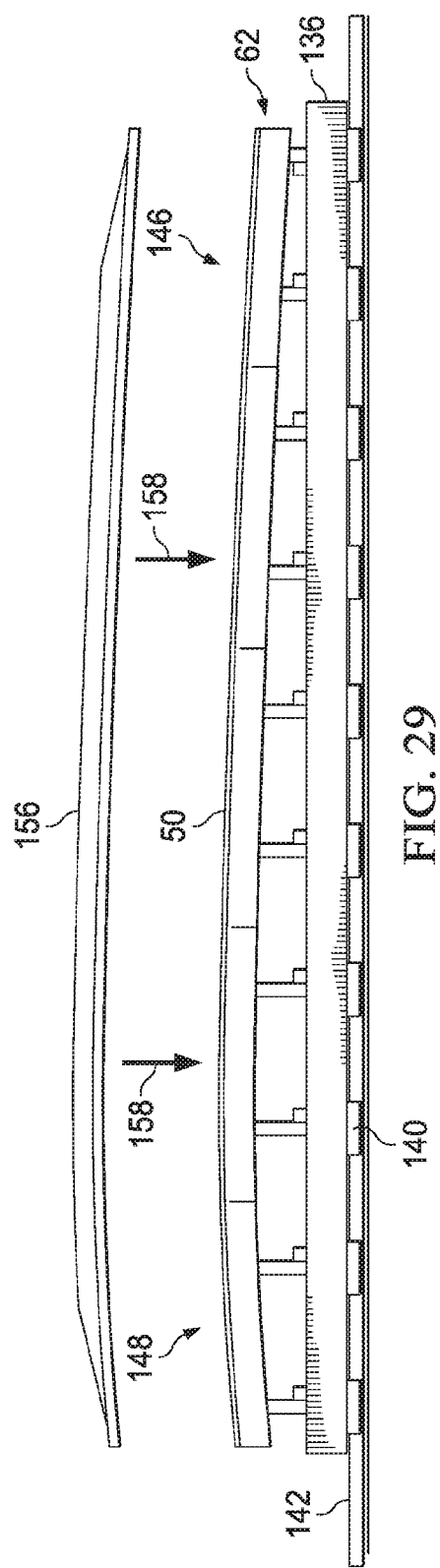

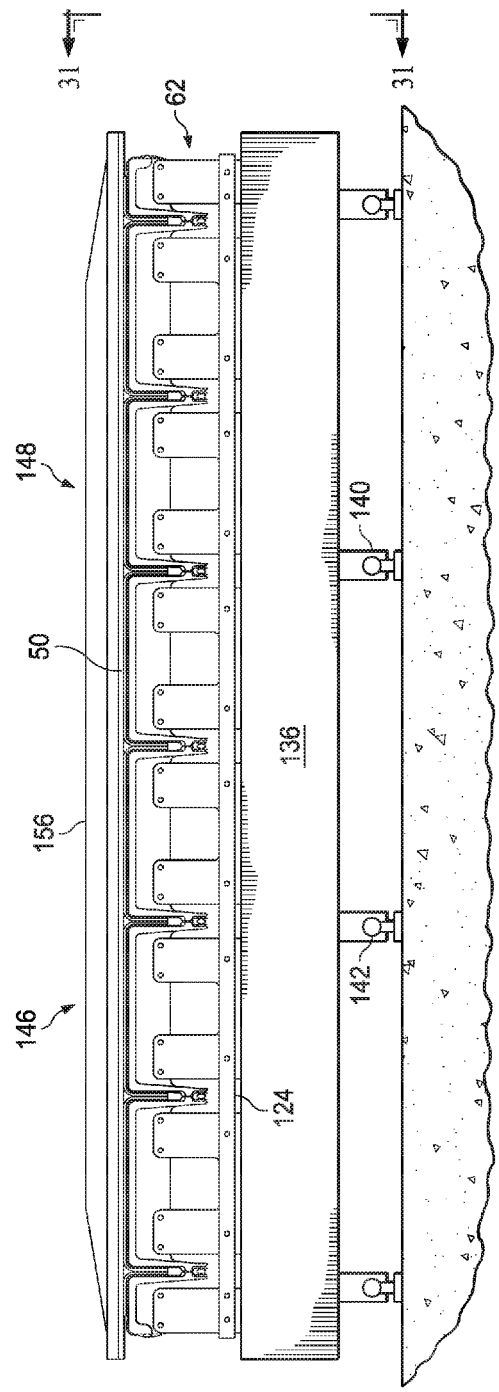
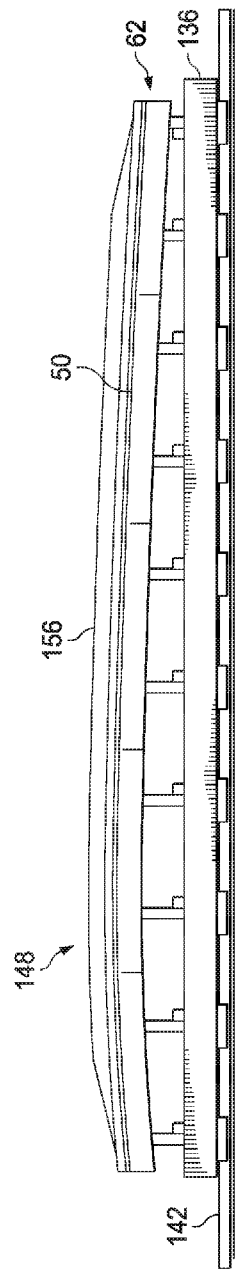

FABRICATION OF STIFFENED COMPOSITE PANELS

CROSS-REFERENCE TO RELATED APPLICATION(S)

This application is a divisional of and claims the benefit of priority to U.S. patent application Ser. No. 13/758,505, filed Feb. 4, 2013, the entire contents of which are incorporated herein by referenced.

BACKGROUND INFORMATION

1. Field

The present disclosure generally relates to the fabrication of stiffened composite panels, and deals more particularly with a method and apparatus for forming, assembling and curing stiffened skins using configurable modular tooling.

2. Background

In order to strengthen and stiffen composite panels such as aircraft wing skins, the panels may incorporate composite stiffeners. For example, aircraft composite wing skins may be stiffened with composite stringers that extend in the span-wise direction of the wing and are attached to the skin by bonding or co-curing techniques.

Existing tooling used to cure stiffened skins is typically large, heavy and expensive to fabricate. The skins are laid up directly on the cure tool along with the stringers and then vacuum bagged. The placement and assembly of the stringers, skin, bagging and related items are performed serially, resulting in relatively long work-in-process (WIP) flow times. Because of these long flow times, multiple identical tool sets may be required to achieve desired production rates. These additional tool sets increase both capital costs and factory floor space requirements. Furthermore, additional cure tooling and associated special tools are also typically required to layup, handle, protect and accurately index the stringers when they are being installed on a skin. These additional tools may also be large and expensive, further adding to capital costs, tooling lead times and floor space requirements.

Another problem with existing tooling is related to the need to install vacuum bagging over the stringers and skin after they have been laid up. This requires that the panel be fully assembled before bagging can be installed, consequently bagging flow time becomes part of the critical production path.

Accordingly, there is a need for a method and apparatus for fabricating stiffened composite panels, such as wing skin panels, that reduce tooling and related floor space requirements, and which increases production flow rates. There is also a need for a method and apparatus of the type mentioned above, which allows parallel processing of layup, bond assembly and bagging operations in order to reduce the amount of WIP and tool turns.

SUMMARY

The disclosed embodiments provide a method and apparatus for fabricating stiffened composite panels, such as aircraft wing skins, which reduce tooling costs, assembly floor space requirements and WIP flow times. Modular tools are used which allow layup, forming, bonding, and bagging processes to be performed in parallel, rather than in series with each other. Smaller, simpler fabrication tooling reduces capital costs and provides production flexibility. Each of the modular tools comprises co-linearly arranged individual segments that control part specific attributes such as contours, jogs, etc. during layup, forming and curing. The tool segments are reconfigurable to permit layup and curing of parts having differing sizes, shapes, contours and other attributes, or to quickly carry out engineering changes to stiffeners. The tools are relatively lightweight, which may reduce cure times.

According to one disclosed embodiment, apparatus is provided for fabricating composite laminate parts. The apparatus comprises at least one forming block module adapted to have a composite laminate formed thereon. The forming block module including a plurality of forming block segments co-linearly arranged and each adapted for forming local attributes of the composite laminate. The apparatus may further comprise a support assembly for supporting and adjusting a position of each of the forming block segments. The forming block segments are removably mounted on the support assembly allowing assembly of a forming block module of a desired length. Each of the forming block segments is slidably adjustable on the support assembly. The forming block module is elongate and includes a forming surface contoured along its length. The apparatus may further comprise at least one cure tool module adapted to have a formed composite laminate cured thereon, the cure tool module including a plurality of cure tool segments co-linearly arranged and each adapted to maintain the shape of local features of the formed composite laminate during curing. Each of the cure tool segments includes vacuum lines adapted for drawing a vacuum bag down against the cure tool segments.

According to another disclosed embodiment, apparatus is provided for fabricating composite laminate stiffeners. The apparatus comprises a plurality of individual forming block modules on which composite pre-preg may be formed into composite laminate stiffeners, each of the forming block modules being elongate and configurable along its length to form any of multiple attributes of a composite laminate stiffener. The apparatus also includes a plurality of cure tool modules on which the composite laminate stiffeners may be cured, each of the cure tool modules being elongate and configurable along its length to substantially match the composite laminate stiffeners formed on the forming block modules. Each of the individual forming block modules includes a plurality of forming block segments arranged co-linearly. The apparatus further comprises a locking device for holding and locking the cure tool modules in indexed relationship to each other. Each of the cure tool modules includes a plurality of cure tool segments arranged co-linearly. The apparatus further comprises a vacuum bag for compacting each of the composite laminate stiffeners. The vacuum bag includes a plurality of separate vacuum bag segments respectively sealed over the cure tool module segments. The vacuum bag segments are sealed together. Each of the cure tool segments includes integral vacuum lines adapted to be coupled with a vacuum source for drawing a vacuum in the vacuum bag.

According to still another embodiment, apparatus is provided for fabricating a stiffened composite wing skin panel. The apparatus comprises a forming cell including a plurality of individual forming block modules on which composite pre-preg may be separately formed into composite laminate stiffeners, and a plurality of individual cure tool modules on which the composite laminate stiffeners may be placed and cured. The Apparatus also includes a stiffener assembly cell in which the cure tool modules each having a composite laminate stiffener placed thereon may be assembled together and held in indexed relationship to each other, and a final assembly cell in which a composite skin is placed on the composite laminate stiffeners in readiness for curing. The apparatus may further comprise a vacuum bag for compacting the composite skin and the composite laminate stiffeners. The vacuum bag includes a plurality of individual vacuum bag segments respectively associated with and sealed to the cure tool modules. Each of the individual forming block modules includes a plurality of forming block segments arranged co-linearly and adjustable for forming desired local attributes of one of the composite laminate stiffeners. Each of the cure tool modules includes a plurality of cure tool segments arranged co-linearly and adjustable in position to match local attributes of one of the composite laminate stiffeners. The cure tool modules are slidable from the stiffener assembly cell to the final assembly cell.

According to a further embodiment, a method is provided of fabricating composite stiffeners. The method comprises assembling at least one forming block module by co-linearly arranging a plurality of forming block segments each adapted for forming a local attribute of a composite stiffener, and forming a composite stiffener by forming composite pre-preg over the forming block. The method also comprises transferring the formed composite stiffener to a cure tool, and curing the formed composite stiffener on the cure tool. The method may further comprise assembling the cure tool by co-linearly arranging a plurality of cure tool segments, each shaped and positioned to match local attributes of the formed composite stiffener.

According to still another embodiment, a method is provided of fabricating a stiffened composite wing skin. The method comprises assembling each of a plurality of forming block modules, including, co-linearly arranging and adjusting a plurality of forming block segments, producing stiffeners by forming composite pre-preg over each of the forming block modules, and assembling each of a plurality of cure tool modules on which the stiffeners may be cured, including co-linearly arranging and adjusting a plurality of cure tool segments to match the geometry of the stiffeners, The method further comprises transferring the stiffeners from the forming block modules to the cure tool modules, assembling a plurality of the stiffeners by placing the cure tool modules side-by-side, placing a composite skin on the plurality of the assembled stiffeners, and curing the composite skin and the assembled stiffeners. The method may include vacuum bagging the assembled stiffeners and the skin, including sealing vacuum bag segments respectively over the cure tool modules, and drawing the vacuum bag segments down against the cure tool modules using vacuum lines on the cure tool modules to evacuate the vacuum bag segments.

According to a further embodiment, a method is provided of fabricating a stiffened composite wing skin, comprising assembling a plurality of cure tool modules each adapted to have a composite stiffener placed thereon, and individually vacuum bagging the cure tool modules using vacuum bag segments. The method also comprises sealing the vacuum bag segments together, placing a composite skin over the composite stiffeners, placing a caul plate over the composite skin, and sealing the vacuum bag segments to the caul plate. The method further comprises drawing the vacuum bag segments respectively down against cure tool modules before the composite stiffeners are respectively placed on the cure tool modules. The method may also comprise curing the composite stiffeners and the skin, removing the vacuum bag segments from the cure tool modules, and returning the cure tool modules to production.

According to still a further embodiment, a method is provided of fabricating a stiffened composite wing skin, comprising forming a plurality of composite stiffeners respectively on individual forming tools, transferring the formed composite stiffeners respectively to cure tools, and assembling the composite stiffeners by assembling the cure tools together. The method further comprises placing a composite skin on the assembled composite stiffeners, and curing the composite skin and the assembled composite stiffeners. The method may also comprise removing the cured composite skin and cured composite stiffeners from the assembled cure tools, disassembling the cure tools, and returning the cure tools to production for curing additional composite stiffeners.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

FIG. 1 is illustration of a plan view of a stiffened composite wing skin panel fabricated in accordance with the disclosed method and apparatus.

FIG. 2 is an illustration of a sectional view taken along the line 2-2 in FIG. 1, contours of the panel not shown.

FIG. 3 is an illustration of a view in the direction designated as FIG. 3 in FIG. 1, illustrating contour of the wing skin panel.

FIG. 16 is an illustration of an end view showing how the cure tool modules are transferred to a stiffener assembly cell.

FIG. 29 is an illustration of a view in the direction designated as FIG. 29 in FIG. 28.

FIG. 30 is an illustration of an end view showing the caul plate having been installed onto the wing skin.

FIG. 31 is an illustration of a view in the direction designated as FIG. 31 in FIG. 30.

DETAILED DESCRIPTION

Figure 4:
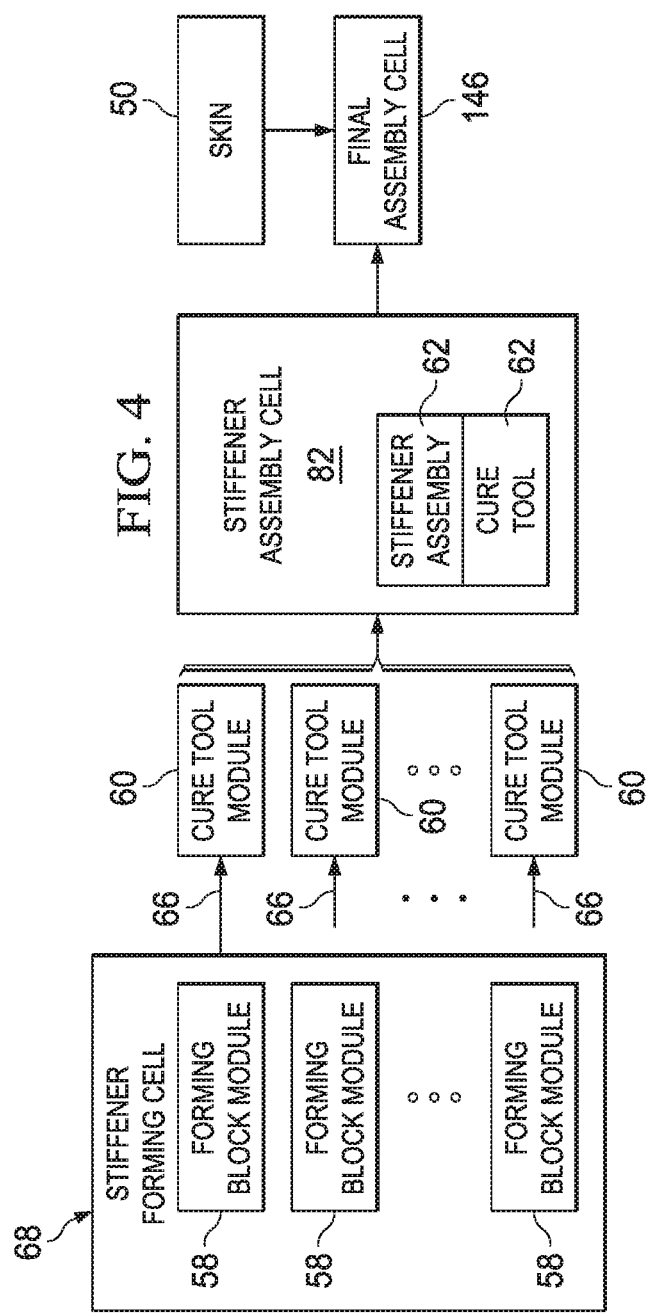
FIG. 4 is an illustration of a simplified block diagram of apparatus for fabricating the wing skin panel shown in FIG. 1.

Referring first to FIGS. 1, 2 and 3, the disclosed embodiments provide a method and apparatus for fabricating a stiffened composite panel, such as a stiffened wing skin panel 48. The wing skin panel 48 may include one or more contoured areas 55 in the chord-wise direction 56 and/or the span-wise direction 54. The wing skin panel 48 comprises a composite wing skin 50 which may be a composite laminate, such as fiber reinforced epoxy, or a sandwich construction having a core (not shown) sandwiched between inner and outer composite laminate skins.

The composite wing skin 50 is strengthened and stiffened by a plurality of composite laminate stiffeners 52 which are arranged generally parallel to each other and extend in the span-wise direction 54 of the wing skin panel 48. The spacing between the stiffeners 52 in the chord-wise direction 56 of the wing skin panel 48 may vary with the application. The wing skin panel 48 may include one or more contoured areas 55 in the chord-wise direction 56 and/or the span-wise direction 54. The composite laminate stiffeners 52 conform along their lengths to contours or other local features or attributes of the wing skin 50. Depending upon the application, the composite laminate stiffeners 52 may be bonded to, or co-cured with the wing skin 50. In the illustrated embodiment, the stiffeners 52 are blade type stringers having a channel-like, generally C-shaped cross-section, however the stiffeners 52 may have other cross-sectional shapes with one or more legs that transfer wing loads. In some cases, the wing skin panel 48 may employ a combination of stingers or other stiffeners 52 that have differing cross sectional geometries in order to meet specific wing load requirements. Although a wing skin panel 48 is shown, the disclosed method and apparatus may be employed to fabricate other types of stiffened panels used in a variety of applications.

Attention is now directed to FIG. 4 which broadly illustrates functional components of the disclosed apparatus. A stiffener forming cell 68 includes a plurality of individual forming block modules 58 used to layup and separately form composite pre-preg (not shown) into the desired stiffener shapes. As will be discussed below in more detail, each of the forming block modules 58 comprises a plurality of configurable forming block segments (not shown in FIG. 4) that may be respectively assembled and adjusted to locally form the pre-preg into the desired stiffener shape. Following forming, the stiffeners 52 are removed from the forming block modules 58 and transferred 66 to cure tool modules 60 that are used to support and maintain the shape of the stiffeners 52 during curing. Each of the cure tool modules 60 comprises a plurality of configurable cure tool segments (not shown in FIG. 4) that may be respectively assembled and adjusted to support local portions of the stiffener 32 during the curing process.

The stiffeners 52 are assembled into a stiffener assembly 62 by transferring the cure tool modules 60 to a stiffener assembly cell 82 where the cure tool modules 60 are assembled in indexed relationship to each other into a cure tool assembly 62. The cure tool assembly 62 and stiffener assembly 148 are then transferred to a final assembly cell 146 where the composite skin 50 is placed on the stiffener assembly 42. A caul plate (not shown in FIG. 4) may be placed over the composite skin 50, following which the composite skin 50 and the stiffener assembly 148 are vacuum bagged and then cured in an oven or an autoclave (not shown). From FIG. 4, it may be appreciated that the tooling used to form and cure the stiffener 52 is modular, allowing multiple individual stiffeners 52 to be formed and readied for curing in parallel. Furthermore, the amount of tooling required is reduced because both the forming block modules 58 and the cure tool modules 60 may be re-configured to fabricate stiffeners 52 having different lengths, contours, cross-sectional shapes and local attributes. Moreover, where a wing skin panel 48 employs stiffeners 52 having two or more differing cross sectional geometries, the forming block modules 58 and the cure tool modules 60 may be configured and mixed as required.

Figure 5:
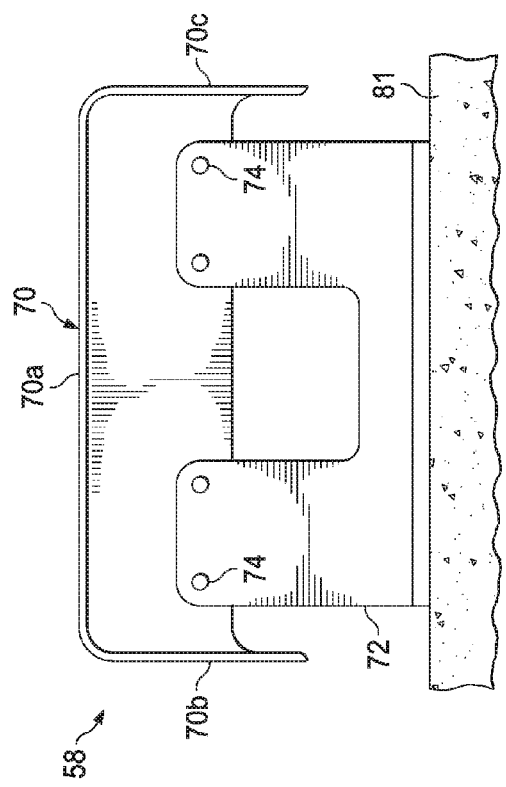
FIG. 5 is an illustration of an end view of one of the forming block modules shown in FIG. 4.
Figure 6:
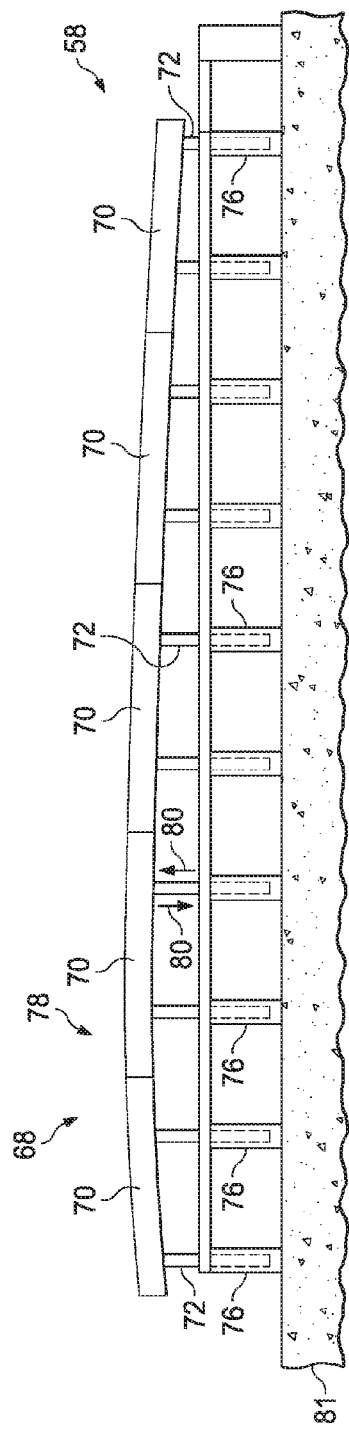
FIG. 6 is an illustration of a longitudinal side view of a forming cell showing individual forming block segments of one of the forming block modules.
Figure 7:
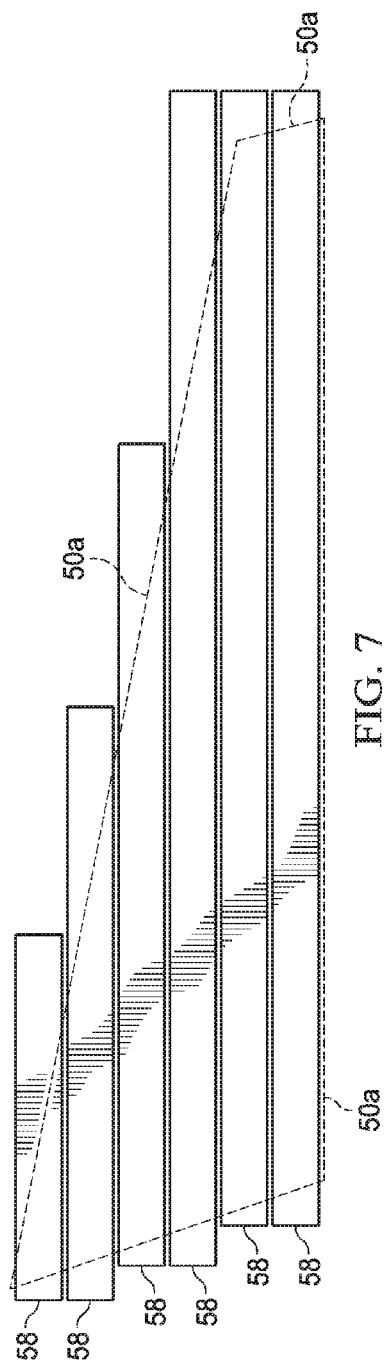
FIG. 7 is an illustration of a plan view showing the lengths of forming blocks modules required to form stiffeners used in wing skin panel shown in FIG. 1, the general outline of the wing skin shown in the phantom.

Referring now to FIGS. 5, 6 and 7, as previously mentioned, the forming cell 68 includes a plurality of forming block modules 58 that may be individually configured to form stiffeners 52 to the desired length, contour and/or cross-sectional shape. Each of the forming block modules 58 comprises a plurality of forming block segments 70, co-linearly arranged end-to-end, as best seen in FIG. 6. Each of the forming block segments 70 may be formed of any suitable material, such as without limitation, machined carbon fiber reinforced plastic, and possesses all of the tool surfaces required to form local attributes of a stiffener 52. For example, in the illustrated embodiment, a stiffener 52 in the form of a blade stringer having a C-shaped cross-section is formed using forming block segments 70 each having three contiguous tool surfaces 70*a*, 70*b*, 70*c* onto which composite pre-preg may be formed using hand layup or automated techniques.

Each of the forming block segments 70 is supported on a standoff 72 which in turn is adjustably mounted 80 on a support assembly 76 resting on a factory floor 81 or other surface. The forming block segments 70 may be fastened to the standoffs 72 by any suitable means, such as by fasteners 74. Bolted assemblies (not shown) or other mechanisms may be used to mount standoffs in a desired position on a support assembly 76, thereby permitting adjustment of the height of the standoffs 72, and thus of the position of the forming block segments 70. In some embodiments, it may also be possible to adjust the position of the forming block segments 70 on the standoffs 72. In the exemplary embodiment, the forming block segments 70 have been adjusted on the support assembly to form a contour 78 substantially matching the contour 55 (FIG. 3) of the wing skin at particular locations on the stiffeners 52. Although not shown in the Figures, the forming block segments 70 may contain forming features and/or be adjusted to form other local attributes of the stiffeners 52, such as ply doublers, jogs, etc. in either the wing skin 50 or the stiffeners 52.

The number of forming block segments 70 in each of the forming block modules 58 may depend on the length of the particular stiffeners 52 being formed. For example, referring to FIG. 7, six forming block modules 58 of differing lengths are needed to form stiffeners 52 that extend along the entire length of the wing skin 50 (shown by the skin outline 50*a*) at different locations in the cord-wise direction 56 (FIG. 1) of the wing skin panel 48. In order to form stiffeners 52 for a wing skin panel having a different outline shape or length, forming block segments 70 may be simply removed or added to the individual forming block modules 58, as required.

Figure 9:
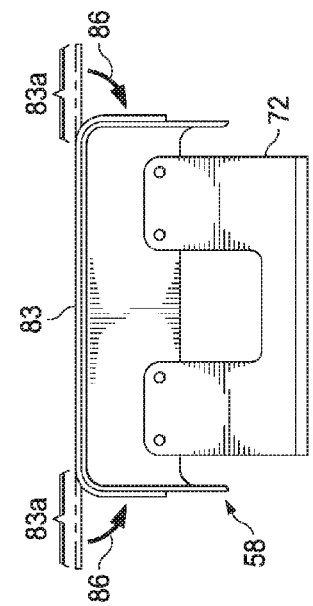
FIG. 9 is an illustration similar to FIG. 8 but showing the edges of the sub-laminate being formed down onto the forming block module.
Figure 8:
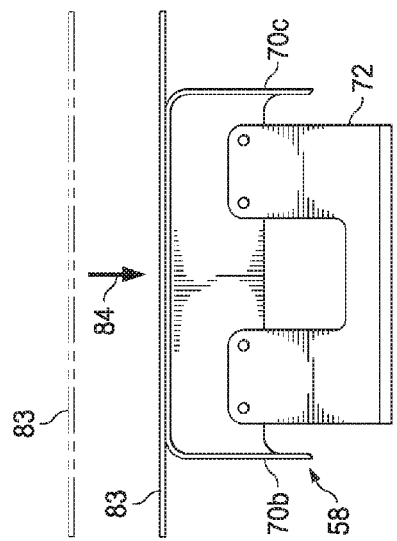
FIG. 8 is an illustration of a view similar to FIG. 5, but showing a sub-laminate being placed on the forming block module.
Figure 10:
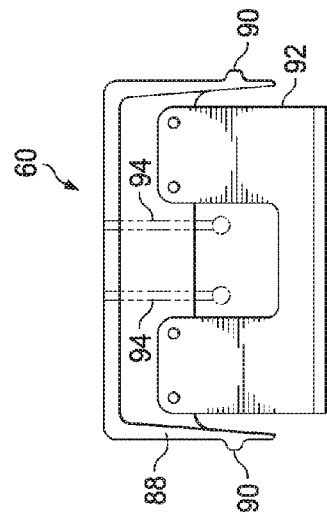
FIG. 10 is an illustration similar to FIG. 9 but showing a formed stiffener being lifted away from the forming block module.

FIGS. 8, 9 and 10 sequentially illustrate a stiffener 52 being formed onto one of the forming block modules 58. Composite pre-preg is laid up 84 either one ply at a time, or as a sub-laminate 83 comprising two or more plies, according to a predetermined ply schedule which dictates the number of plies and their fiber orientations. As a ply or sub-laminate 83 is laid up 84, the edges 83*a* of the pre-preg plies are formed down onto flange surfaces 70*a*, 70*b* (FIG. 8) of the forming block module 58. Plies or sub-laminates 83 are laid up 84 in this manner until the entire thickness of the stiffener 52 has been formed.

Figure 11:
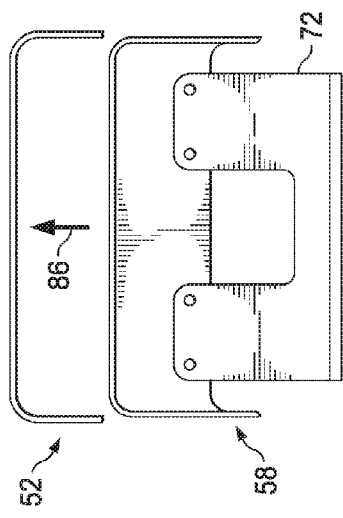
FIG. 11 is an illustration of an end view of one of the cure tool modules shown in FIG. 4.
Figure 12:
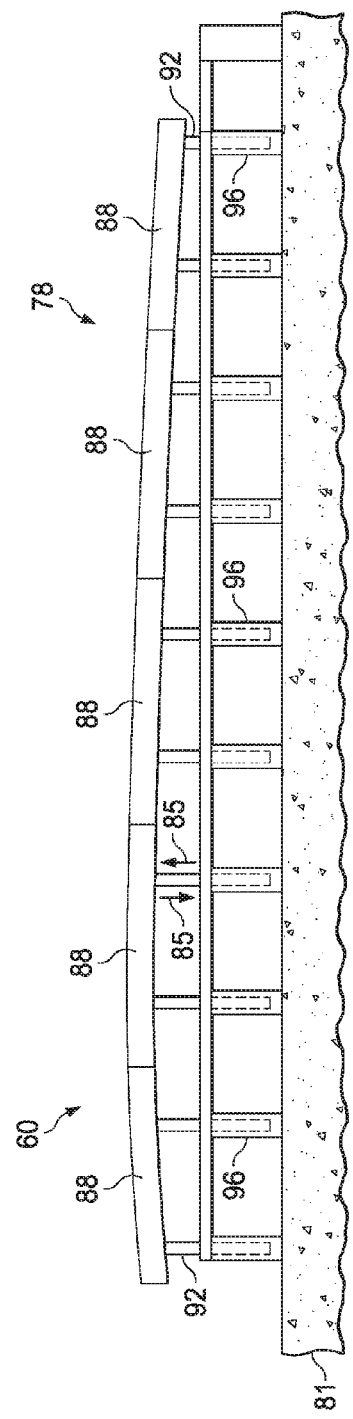
FIG. 12 is an illustration of a longitudinal side view of the cure tool module shown in FIG. 11 adjustably mounted on supports and showing the individual cure tool segments.
Figure 13:
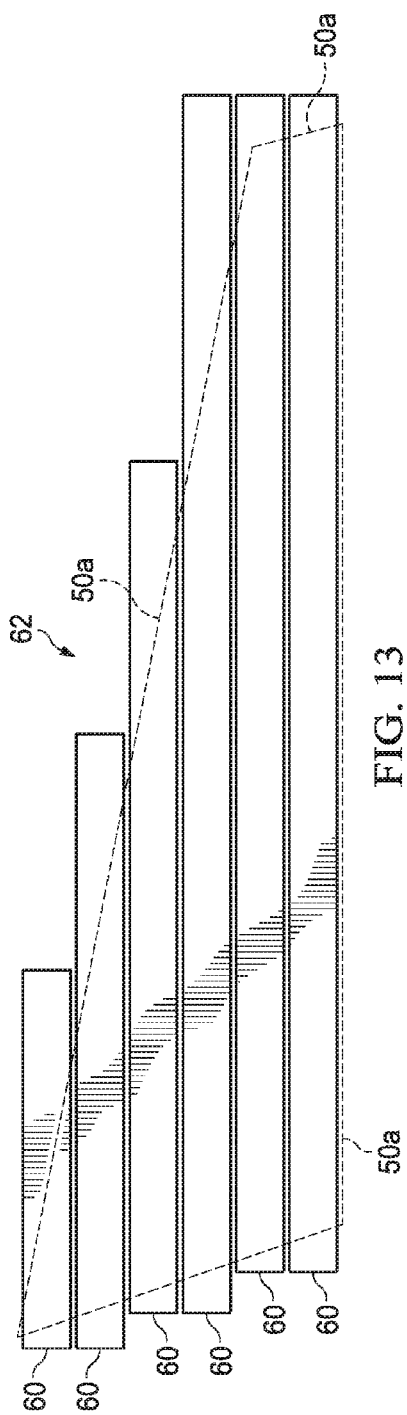
FIG. 13 is an illustration of a plan view showing the lengths cure tool modules required to form stiffeners used in the wing skin panel shown in FIG. 1, the general outline of the wing skin shown in the phantom
Figure 15:
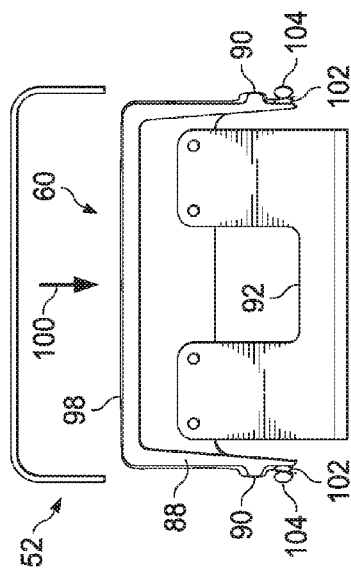
FIG. 15 is an illustration similar to FIG. 14 but showing a formed laminate stiffener being placed onto the cure tool module, over a vacuum bag segment.

After a stiffener 52 has been laid up and formed on the forming block modules 58 as described above, it is removed from the forming block module 58 as shown in FIG. 10, and transferred to a cure tool module 60 shown in FIGS. 11 and 12. The cure tool module 60 comprises a plurality of cure tool segments 88 co-linearly arranged as best seen in FIG. 12. Each of the cure tool segments 88 is mounted on standoffs 92 which are adjustably supported on a support assembly 96 resting on a factory floor 81 or other supporting surface. The standoffs 92 are slidable 85 on the support assembly 96, thereby permitting each of the cure tool segments 88 to be adjusted in position to match local surfaces of a stiffener 52 that has been formed on one of the forming block modules 58. Each of the cure tool modules 60 includes lateral ribs 90 whose purpose will be described later. Similar to the previously described forming block modules 58, the cure tool segments 88 are configured to form cure tool modules 60 of the lengths corresponding to the stiffeners 52 that are needed to cover a wing skin 50, an outline 50*a* of which is shown in FIG. 13 overlaid on cure tool modules 60 of various lengths. Each of the cure tool modules 60 may further include integral vacuum lines 94 that are adapted to be coupled with a vacuum source (not shown) whose function will be discussed later.

Figure 14:
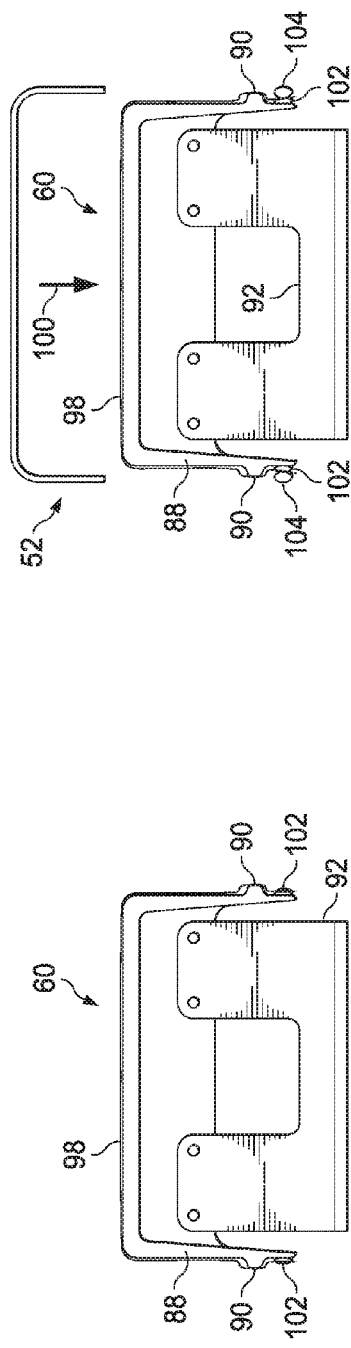
FIG. 14 is an illustration similar to FIG. 11, but showing a vacuum bag segment sealed over the cure tool module.

Referring now to FIG. 14, as part of the process of vacuum bagging the stiffened wing skin panel in preparation for curing, a vacuum bag segment 98 is placed over each of the cure tool modules 60 and is sealed thereto by sealing tape 102 or a similar suitable sealant. The vacuum bag segments 98 are made of substantially flexible conventional material, and may be reusable or non-reusable. After the vacuum bag segment 98 has been installed as shown in FIG. 14, the vacuum bag segment 98 is drawn down tightly against the cure tool module 60 by evacuating the vacuum bag segment 98 using the integral vacuum lines 94 within the cure tool module shown in FIG. 11. With the vacuum bag segment 98 drawn tightly down against the cure tool module 60, a formed composite stiffener 52 is placed 100 onto the cure tool module 60, overlying the vacuum bag segment 98. Next, seals 104, which may comprise a suitable sealant tape, are placed along the bottom edges of the vacuum bag segment 98 overlying the sealing tape 102 and extending along the entire length of the vacuum bag segment 98.

Figure 17:
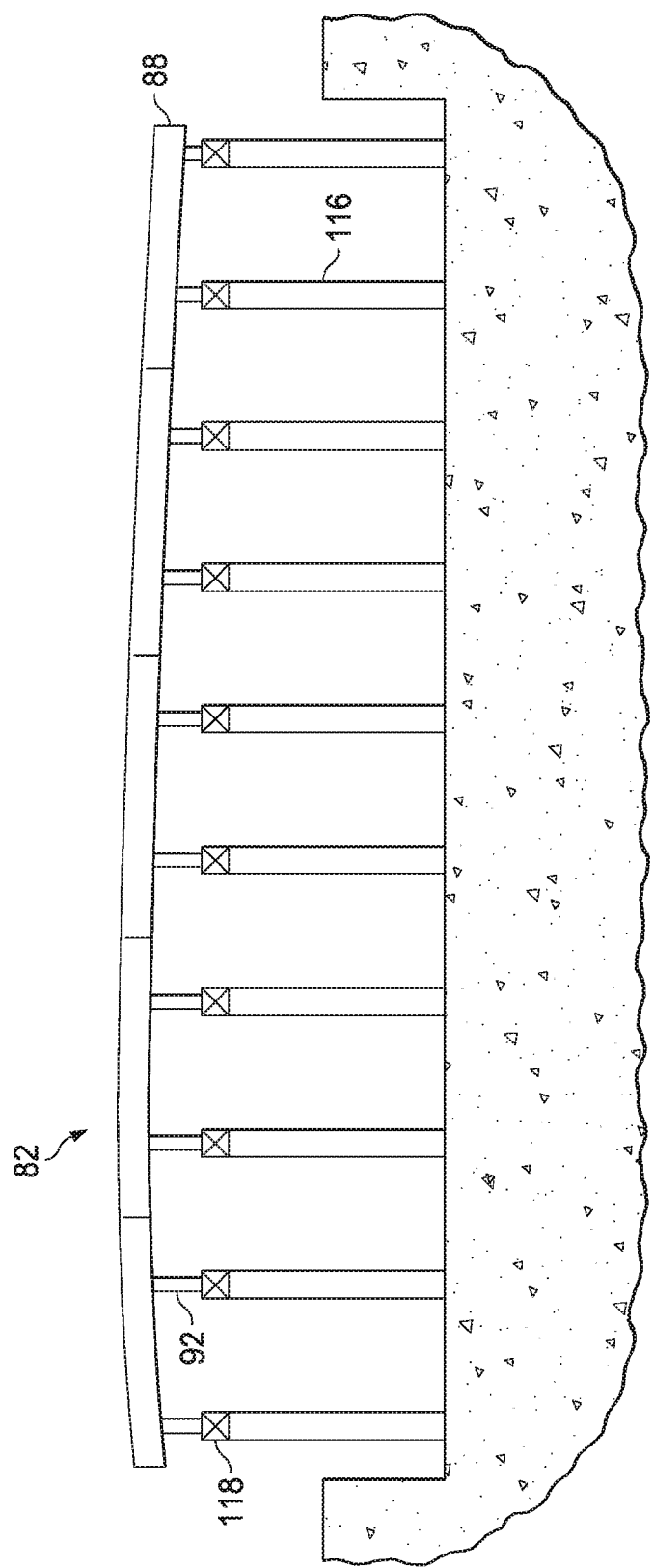
FIG. 17 is an illustration of a longitudinal side view of the stiffener assembly cell.
Figure 18:
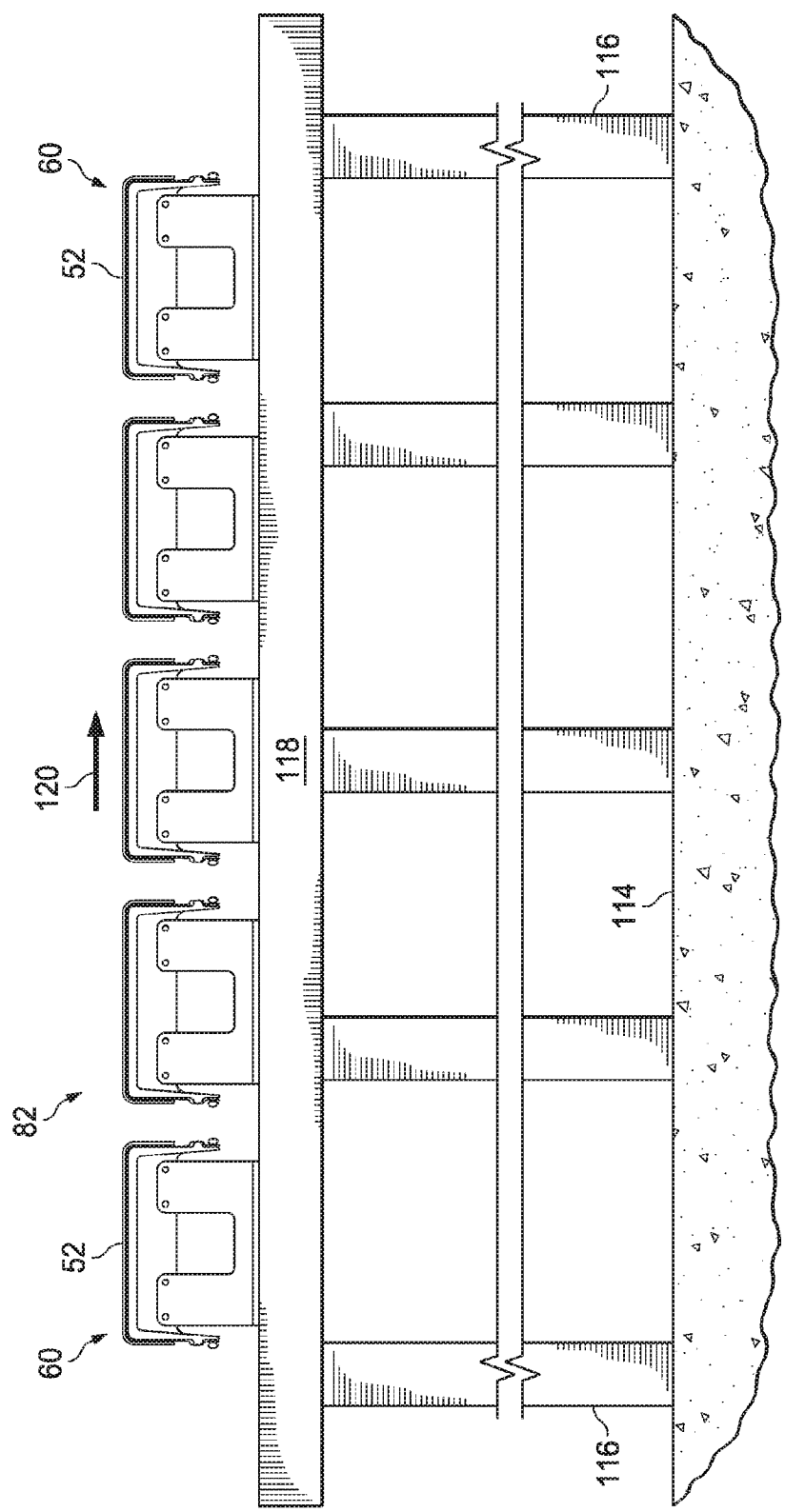
FIG. 18 is an illustration of an end view of the stiffener assembly cell shown in FIG. 17.

Attention is now directed to FIGS. 16, 17 and which illustrate a method of transferring the cure tool modules 60 to the stiffener assembly cell 82. As shown in FIG. 16, a bridge 108 that is pivotably mounted on the support assembly 96 is swung 110 into registration with an elevated cure tool assembly table 118 at the stiffener assembly cell 82. The elevated cure tool assembly table 118 may comprise a series of cross beams mounted on be supports 116 that mount the cross beams above a factory floor or other surface 114 at a height 112 that allows workers to access the area beneath the cure tool modules 60. With the bridge 108 having been swung into its raised position, the cure tool modules 60 may be slid 106 across the bridge 108 onto the cure tool assembly table 118, following which the bridge 108 may be lowered, and another support assembly 96 having a cure tool module 60 mounted thereon is transported to the stiffener assembly cell 182 in preparation for moving the next cure tool module 60 onto the cure tool assembly table 118. Alternatively, the cure tool modules 60 may be placed and assembled as a group on the elevated cure tool assembly table 118, following which the stiffeners 52 may be transferred one-by-one to the awaiting cure tool modules 60, thereby eliminating the need for transferring the stiffeners 52 from the individual support assemblies 96.

Figure 19:
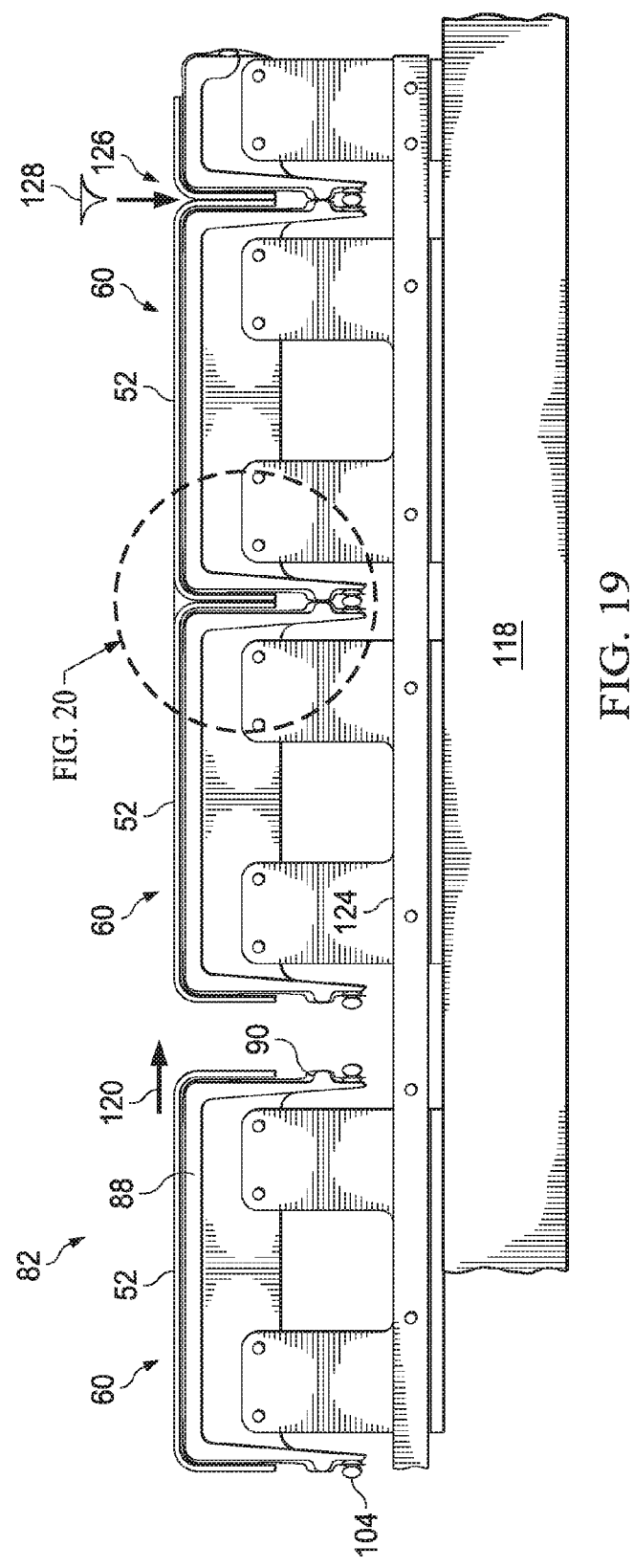
FIG. 19 is an illustration of an enlarged end view showing several of the cure tool modules locked together, wherein a filler noodle is about to be installed between adjacent stiffener layups.
Figure 20:
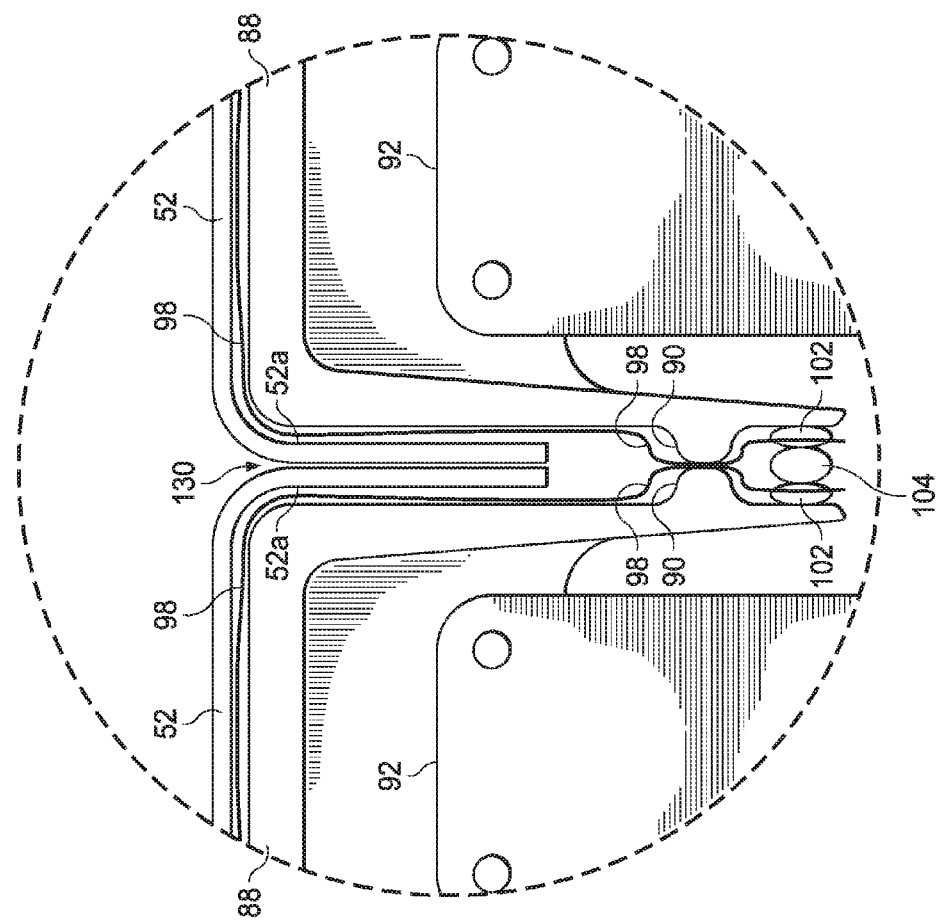
FIG. 20 is an illustration of the area designated as FIG. 20 in FIG. 19, better showing the vacuum bag seals.
Figure 21:
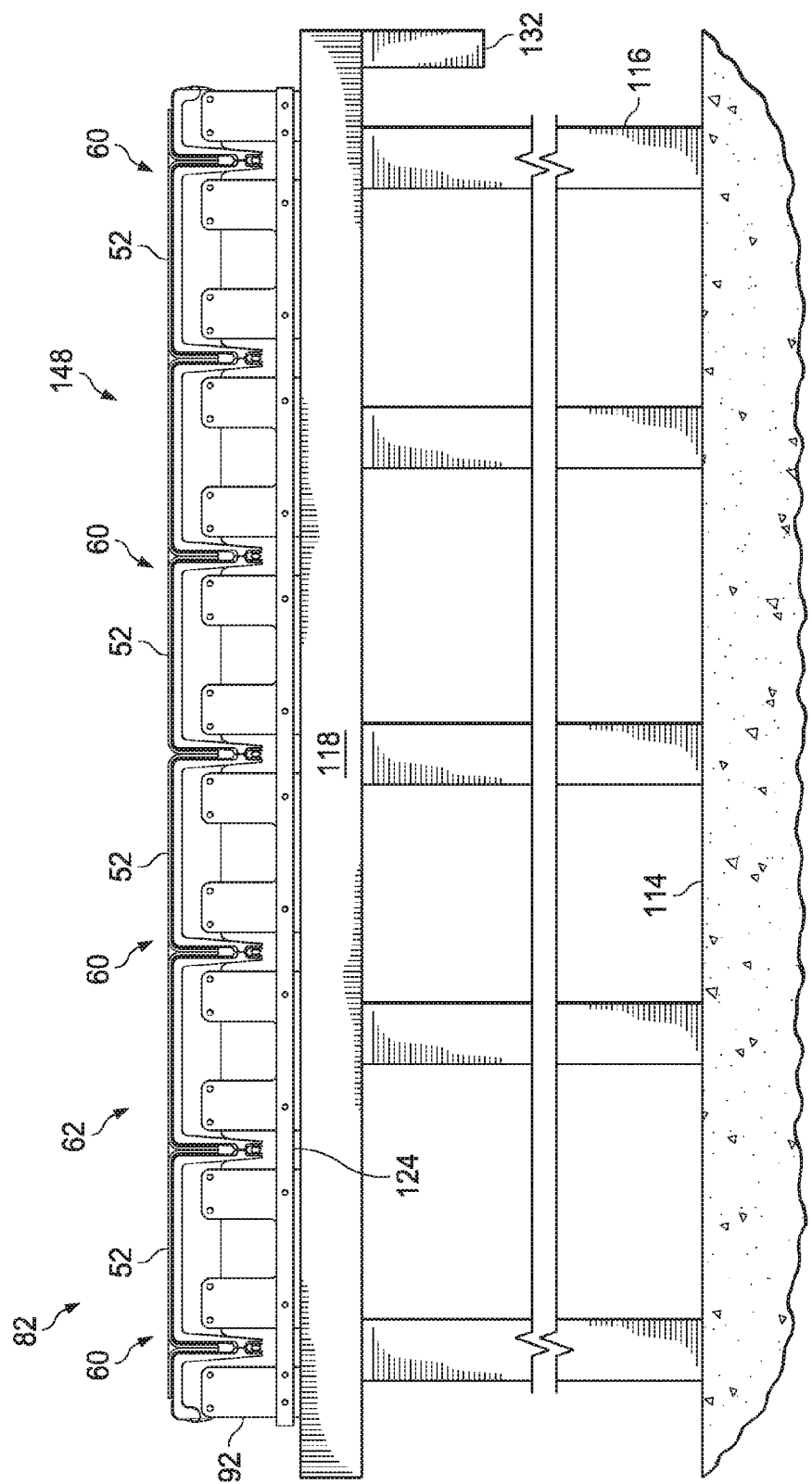
FIG. 21 is illustration of an end view of the stiffener assembly cell, showing the assembled stiffeners on cure tool modules that have been locked and indexed together.

Referring now to FIGS. 19, 20 and 21, the cure tool modules 60 are slid toward each other into an a preselected, indexed position. The indexed position of the cure tool modules 60 is maintained by installing a locking bar 124 which holds the cure tool modules 60 together as a single cure tool assembly 62. The locking bar 124 is releasably attached to each of the cure tool modules 60 by any suitable means, such as clamps or releasable fasteners. The ribs 90 may assist in holding the vacuum bag segments 98, and may assist in stabilizing/isolating the seals 102, 104.

When the stiffeners 52 are brought together to form a stiffener assembly 148, a radius groove 126 may be formed between adjacent stiffeners 52. The radius groove 126 may be filled using a filler or "noodle" 128 which may comprise, for example and without limitation, a folded film adhesive or a pre-preg. FIG. 21 illustrates an indexed cure tool assembly 62 having a completed stiffener assembly 148 thereon. FIG. 21 also illustrates a swingable bridge 132 pivotably mounted on one end of the cure tool assembly table 118.

Figure 22:
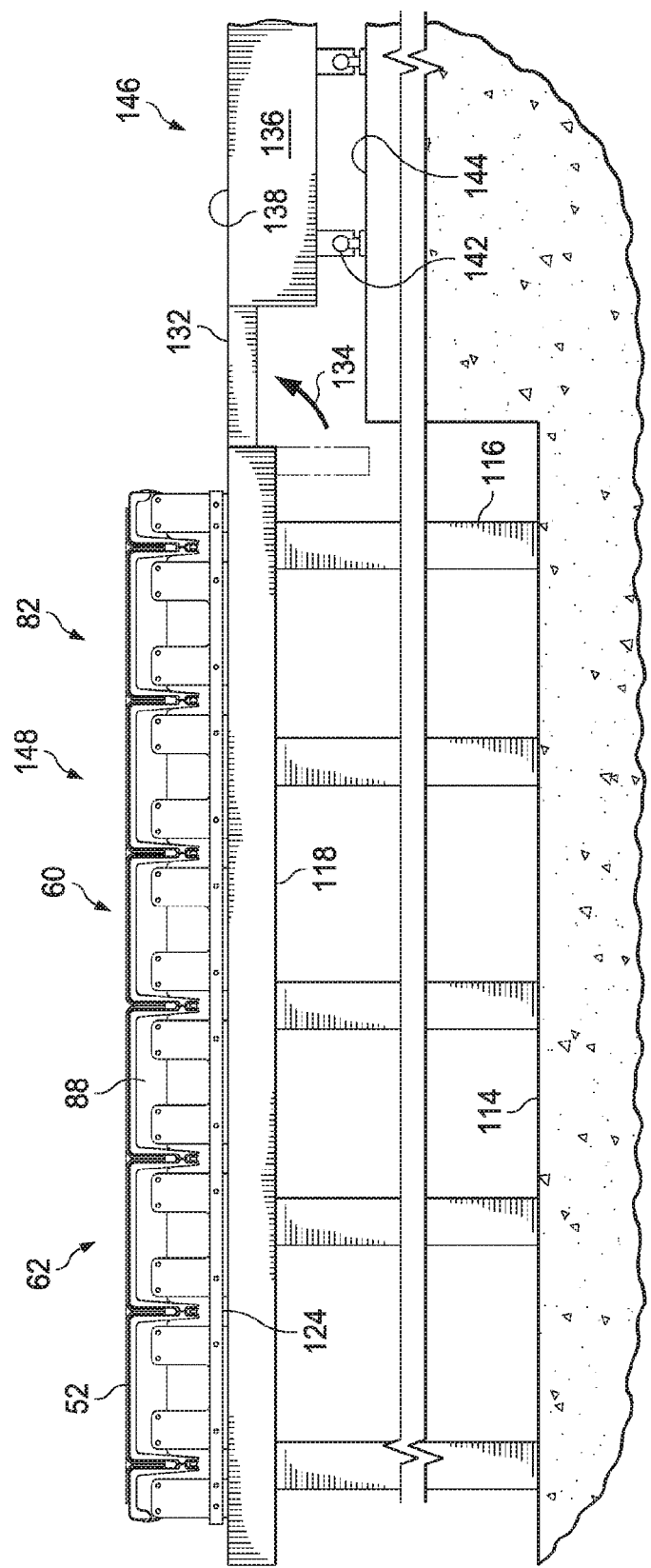
FIG. 22 is an illustration similar to FIG. 21 but also illustrating a final assembly cell.
Figure 23:
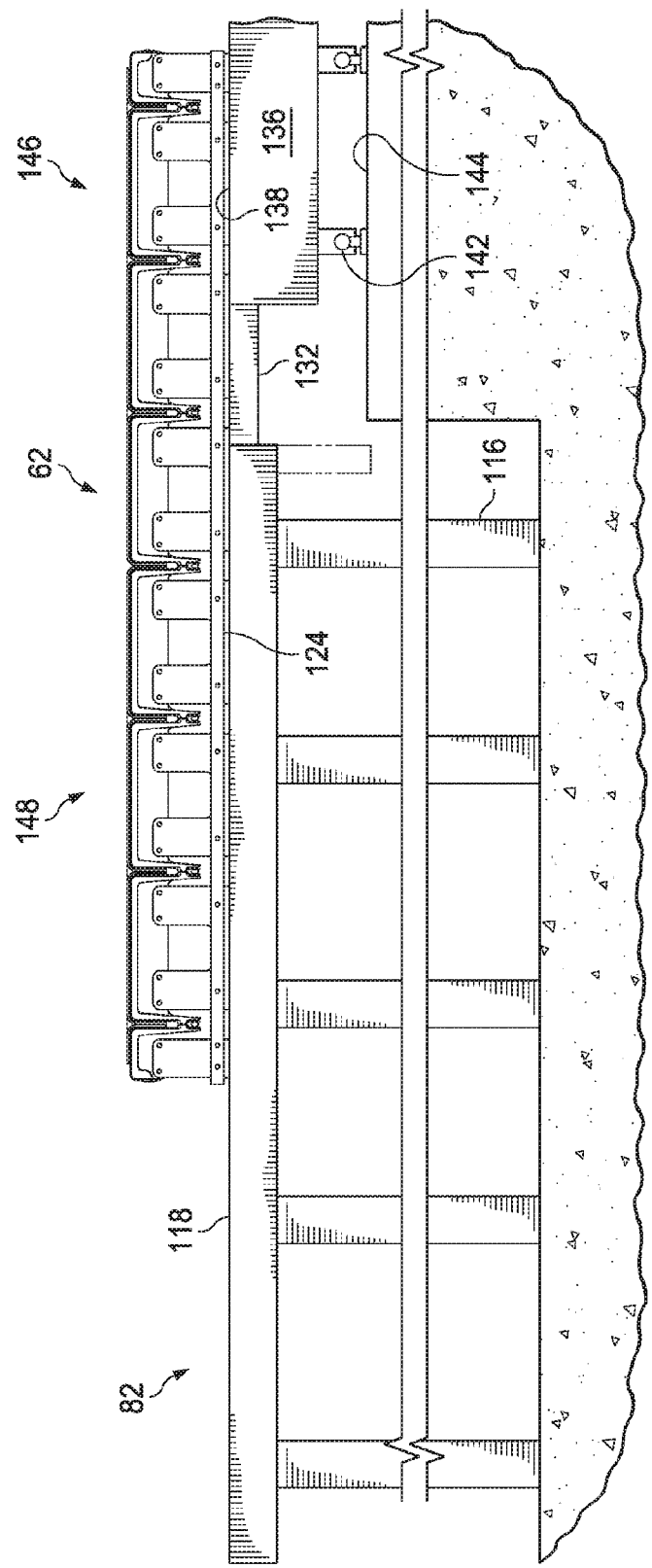
FIG. 23 is an illustration similar to FIG. 22 but showing the stiffener assembly having been partially transferred to the final assembly cell.
Figures 24, 25:
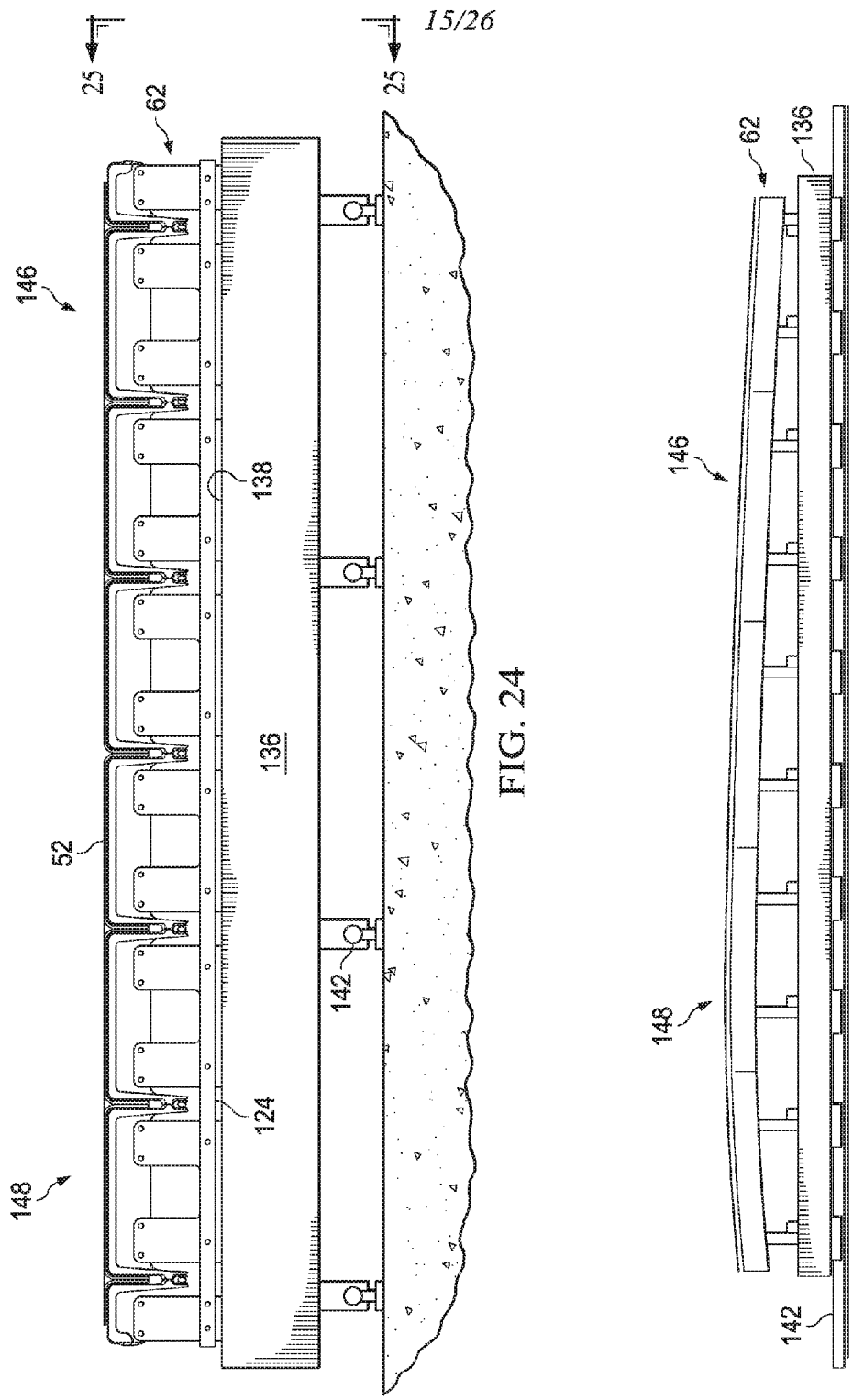
FIG. 24 is an illustration of an end view showing the stiffener assembly having been transferred onto a cure rack in the final assembly cell.
FIG. 25 is an illustration of a view in the direction designated as FIG. 25 in FIG. 24.

Attention is now directed to FIGS. 22-25 which illustrate the steps involved in transferring the cure tool assembly 62 and stiffener assembly 148 from the stiffener assembly cell 82 to the final assembly cell 146. As shown in FIG. 22, the bridge 132 on cure tool assembly table 118 is pivoted to its raised position, registering with a supporting surface 138 on a cure rack 136 forming part of the final assembly cell 146. The cure rack 136 is mounted on rails 142 for sliding movement over a supporting surface 144. With the bridge 132 in its raised position, the cure tool assembly 62 and stiffener assembly 148 may be slid across the cure tool assembly table 118 and bridge 132 onto the cure rack 136, as illustrated in FIGS. 23-25.

Figure 26:
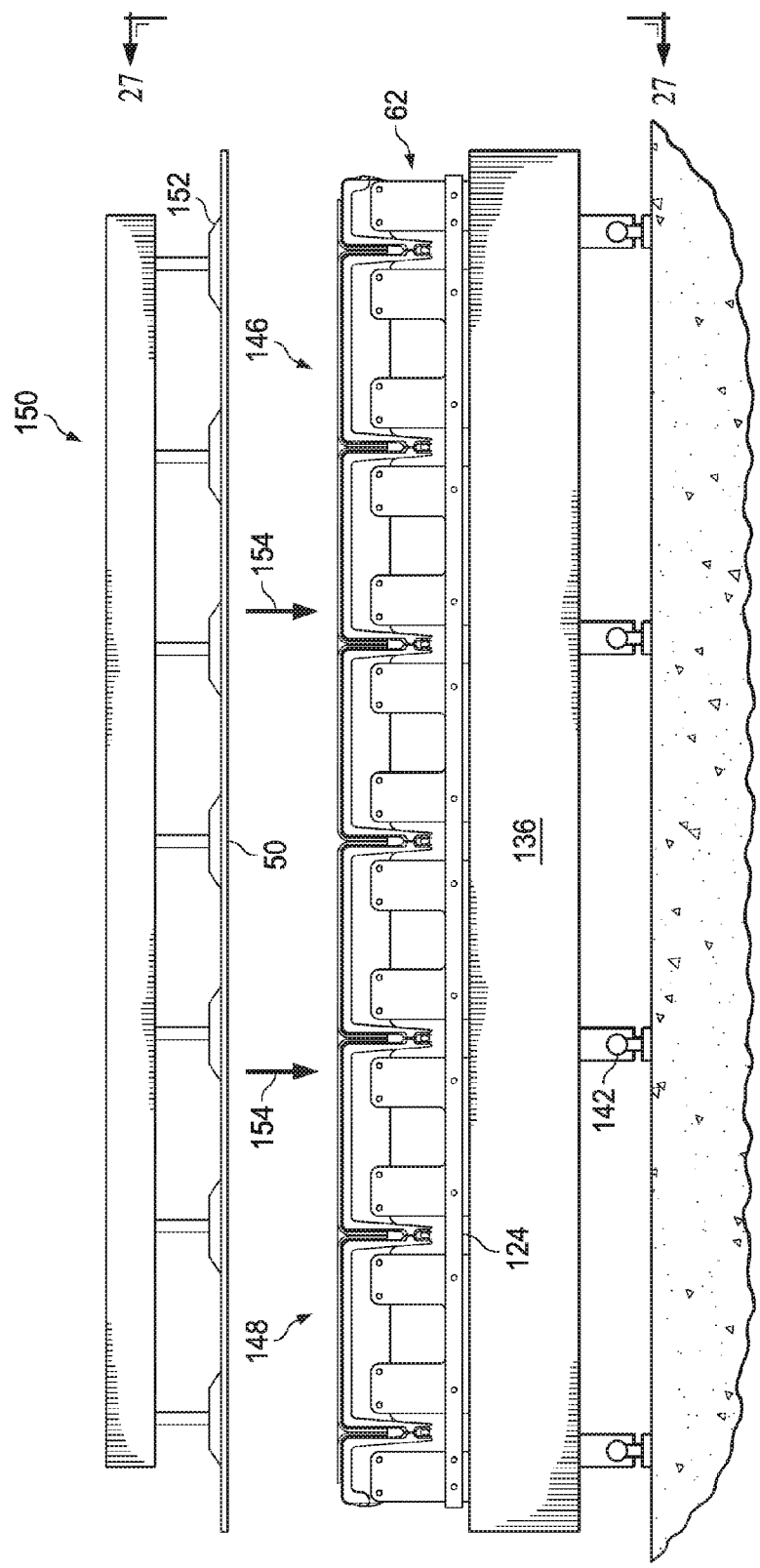
FIG. 26 is an illustration of an end view similar to FIG. 24, but showing a wing skin being placed onto the stiffener assembly.
Figure 27:
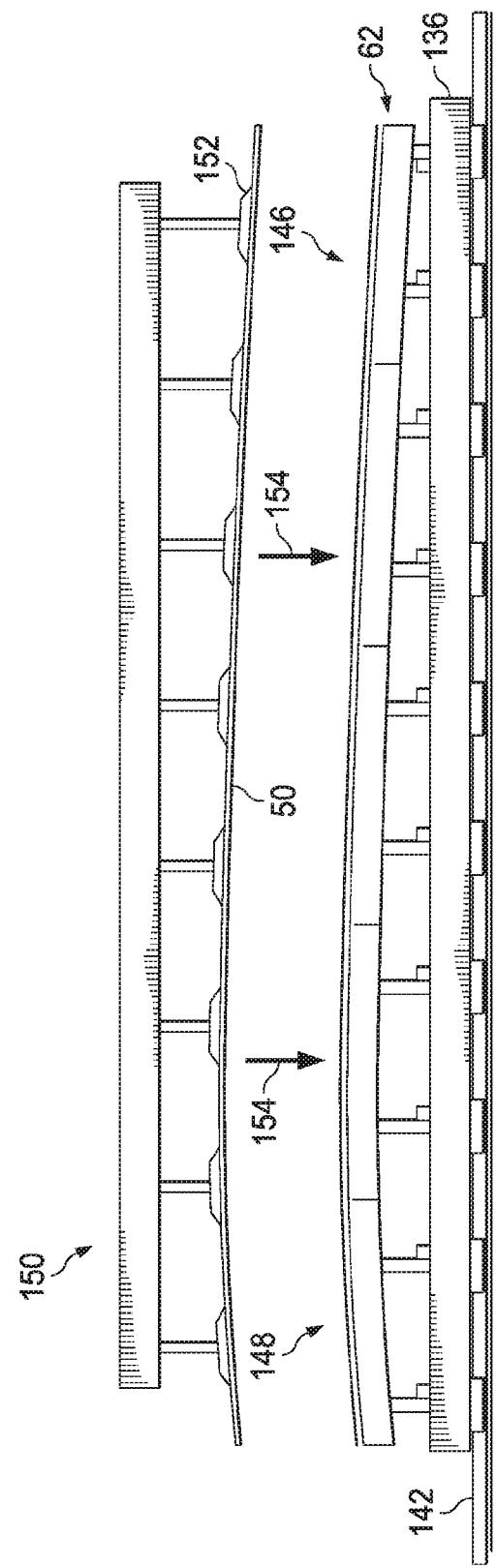
FIG. 27 is an illustration of a view in the direction designated as FIG. 27 in FIG. 26.
Figure 28:
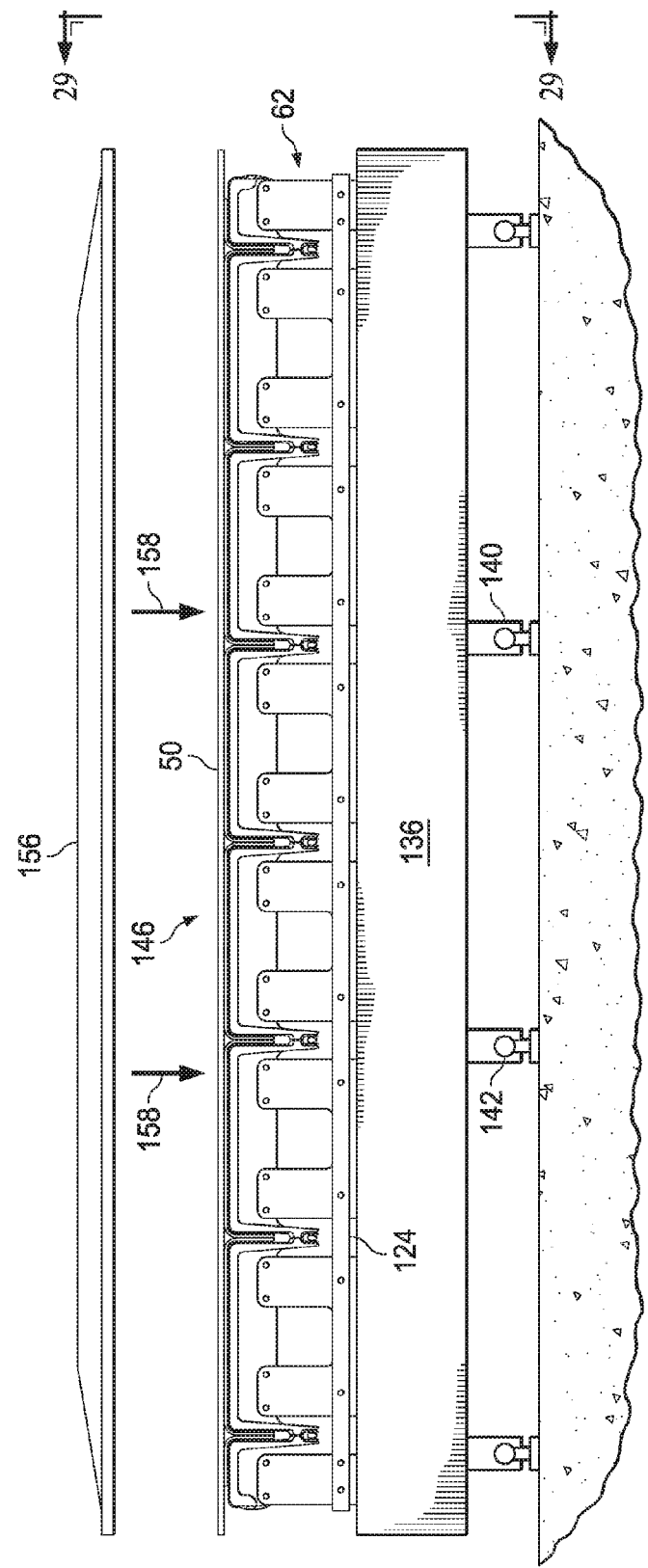
FIG. 28 is an illustration showing the wing skin having been placed on the stiffener assembly, and a caul plate about to be installed over the wing skin.

Referring now to FIGS. 26 and 27, the cure rack 136 may be moved along rails 142 to a position in proximity to a manipulator 150 used to place a composite skin 50 onto the stiffener assembly 148. The manipulator 150 may comprise any suitable automation equipment which may include suction cups 152, or other suitable holding means for releasably holding the skin 50 as the manipulator 150 places 154 it onto the stiffener assembly 148. In an alternate embodiment, the manipulator 150 may be used to place the skin 50 onto the stiffener assembly 148 while the stiffener assembly 148 is on the elevated assembly table 118, as shown in FIG. 21, prior to being transferred to the final assembly cell 146.

Figure 32:
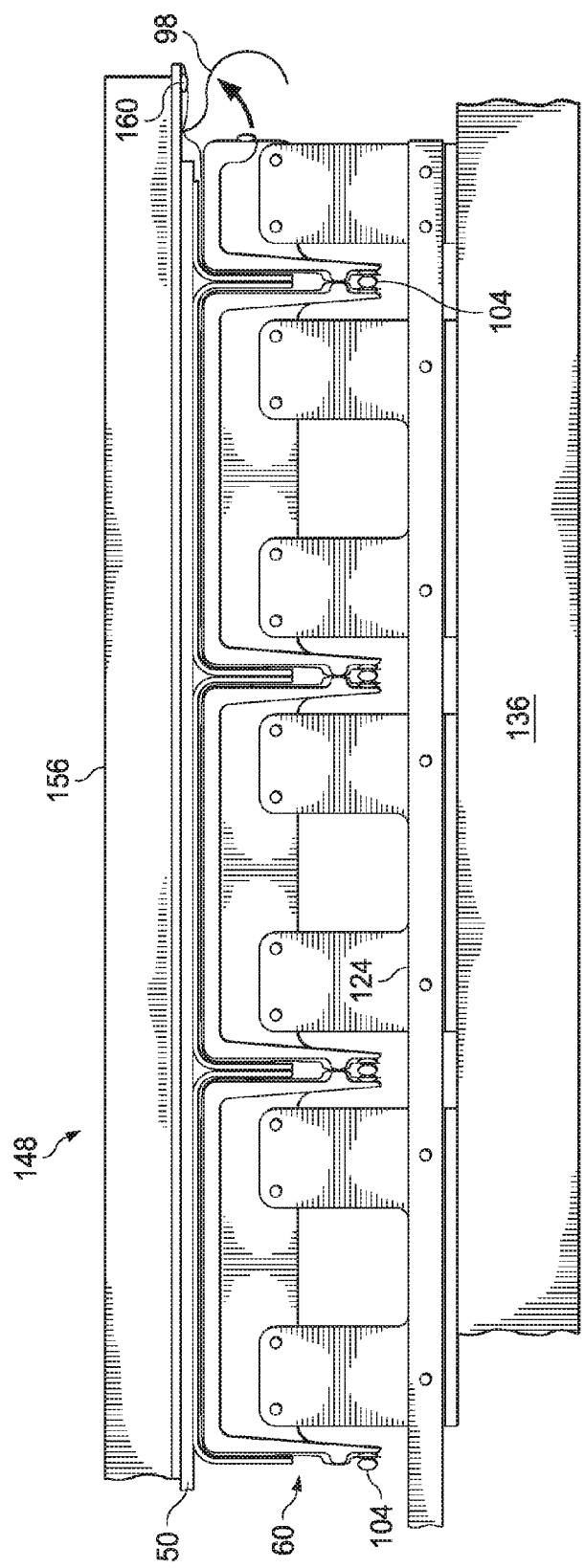
FIG. 32 is an illustration of an end view of the final assembly cell, showing how the assembled vacuum bag segments are sealed to the caul plate.
Figure 33:
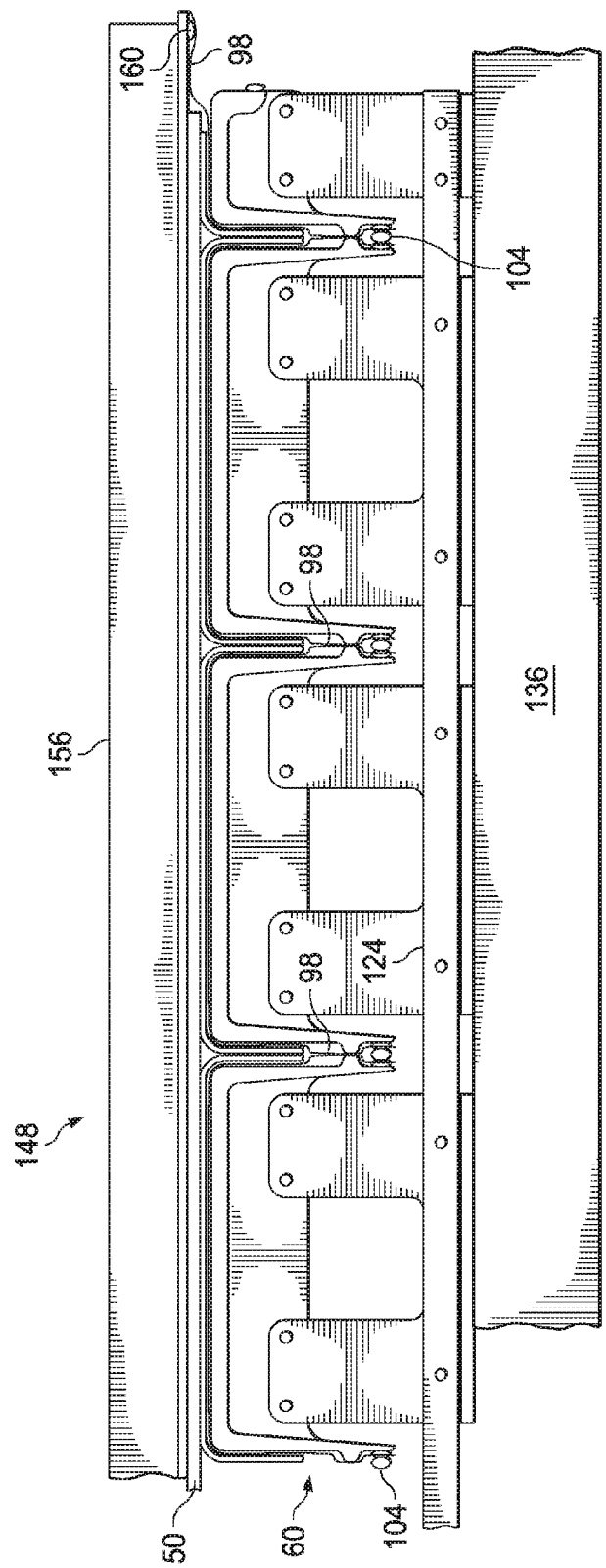
FIG. 33 is an illustration similar to FIG. 32 but showing the vacuum bag having been evacuated in preparation for a curing operation.

Referring to FIGS. 28-31, with the skin 50 having been placed 158 onto the stiffener assembly 148, a caul plate 156 is placed 158 onto the skin 50 in preparation for bagging and curing the wing skin panel 50. Next, as shown in FIG. 32, vacuum bagging of the wing skin panel 50 is completed by sealing the periphery of the vacuum bag segments 98 against the caul plate 156 using a suitable sealant 160. With the vacuum bag having been sealed, the applied vacuum is reversed (see FIG. 33) by releasing the vacuum within the cure tool modules that previously held the vacuum bag segments 98 against the cure tool modules and 60, and evacuating the volume within the vacuum bag surrounding the stiffener assembly 148 and the skin 50.

Figure 34:
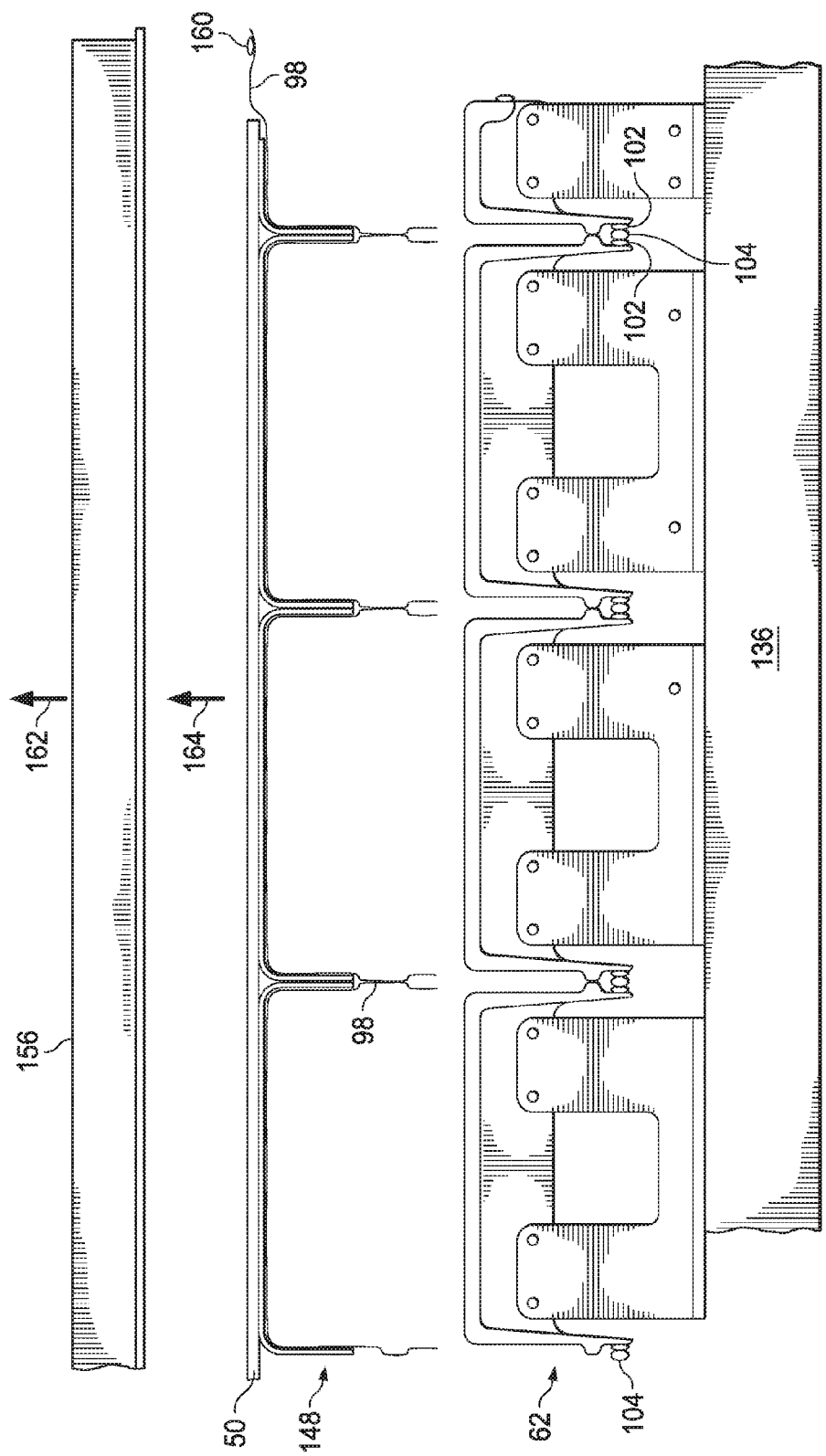
FIG. 34 is an illustration of an end view of the stiffener assembly and caul plate being removed from the cure tool assembly.
Figure 35:
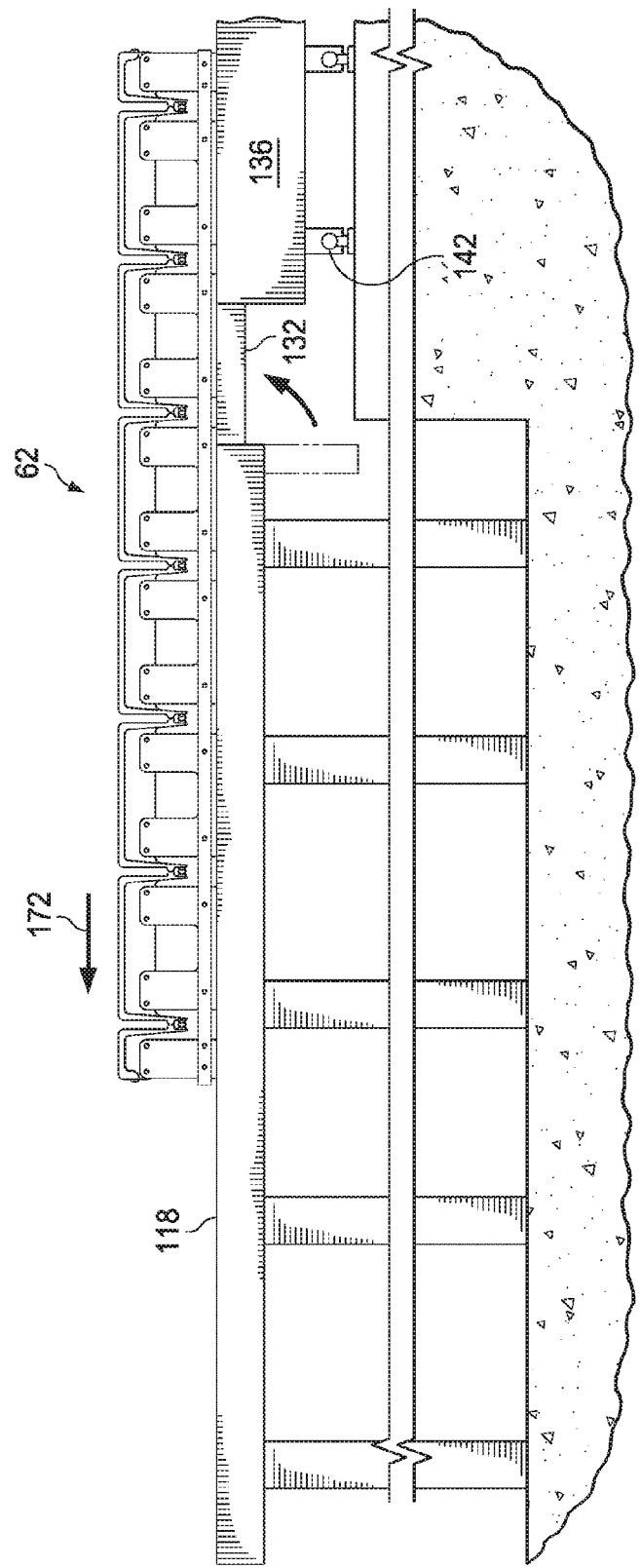
FIG. 35 is an illustration of an end view showing the cured tool assembly being returned to production.

With the vacuum bag having been evacuated, the cure rack 136 along with the cure tool assembly 62 and stiffener assembly 148 can be moved into an oven or autoclave (not shown) where the stiffener assembly 148 is cured. As shown in FIG. 34, following curing, the caul plate 156 is removed 162, and the cured stiffener assembly 148 is the lifted away from the cure tool assembly 62. The vacuum bagging material may then be removed from the cured stiffener assembly 148 by pulling or cutting it away. Although not shown in the drawings, the seals 102 remain attached to and are lifted away with the vacuum bag segments 98. As shown in FIG. 35, after the cured stiffener assembly 148 has been removed from the cure tool assembly 62, the cure rack 136 may be slid into proximity to the elevated cure tool assembly table 118, and the bridge 132 is swung into position to allow the cure tool assembly 62 to be slid 172 from the cure rack 136 back onto the table in readiness to receive the next set of stiffeners 52.

Figure 36:
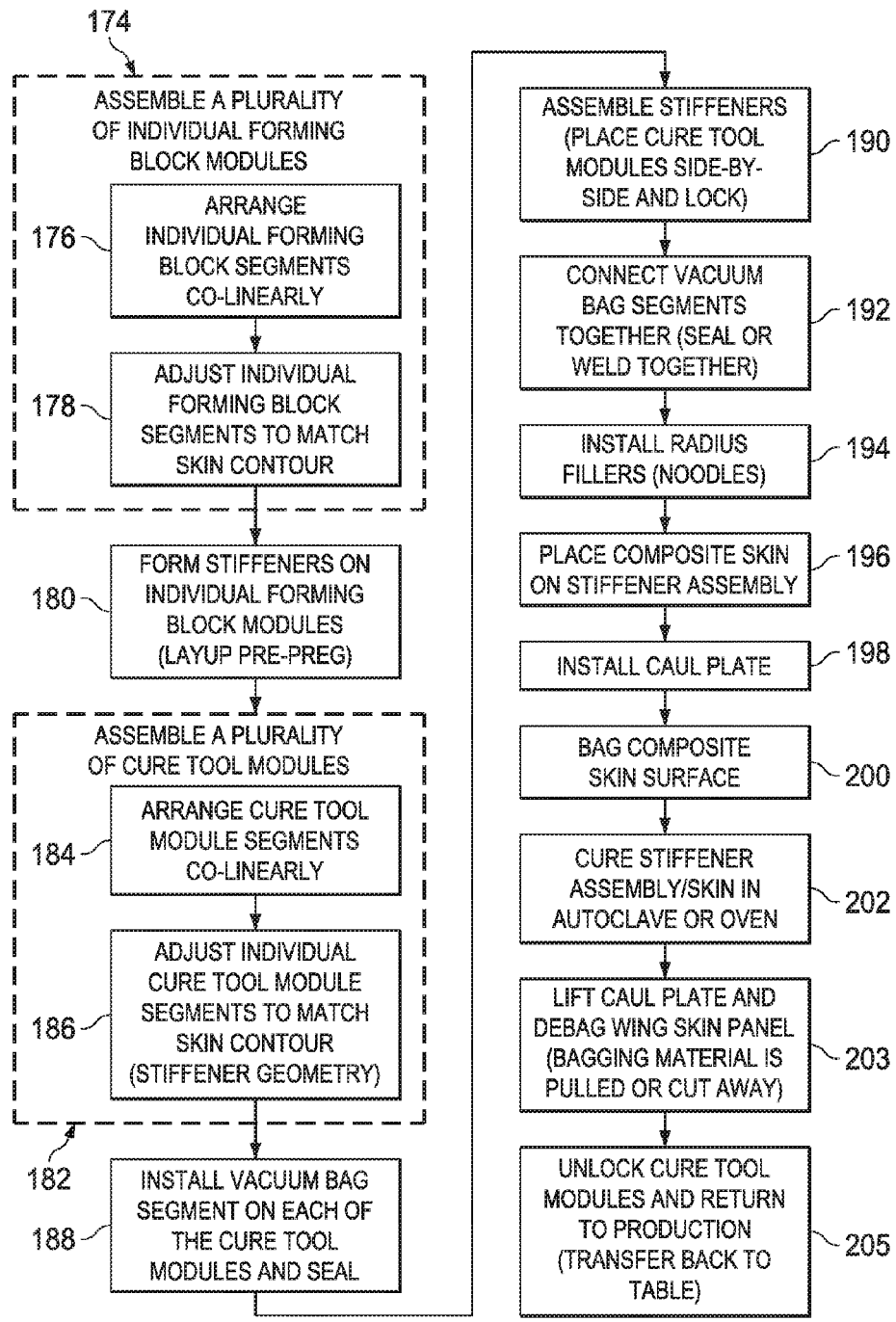
FIG. 36 is an illustration of a flow diagram of a method of fabricating a stiffened composite wing skin panel using modular tool components.

Attention is now directed to FIG. 36 which broadly illustrates the steps of a method of fabricating a stiffened composite panel, such as the wing skin panel previously described. At 174, a plurality of individual forming block modules 58 is assembled. The individual forming block modules 58 are assembled by arranging individual forming block segments 70 co-linearly as shown at step 176, and adjusting the individual forming block segments 70 to match a desired skin contour or other skin attributes, at step 178. At 180, the composite stiffeners 52 are formed on the individual forming block modules 58 by laying up composite pre-preg over the forming block modules 58.

At 182, a plurality of cure tool modules 60 is assembled by arranging the cure tool modules segments 88 co-linearly at step 184, and adjusting the individual cure tool segments 88 at 184 to match the skin contour or other skin attributes. At step 188, vacuum bag segments 98 are installed on each of the cure tool modules 60 and sealed thereagainst. At 190, the stiffeners 52 are assembled into a stiffener assembly 148 by placing the cure tool modules 60 side-by-side, and locking them together in indexed relationship to each other. The vacuum bag segments 98 are then connected together using seals 104 or by welding them together at step 192. Radius fillers or noodles 128 may be installed in radius grooves 126 between the stiffeners 52, as required, in step 194. At 196, a composite skin 50 is placed on the stiffener assembly 148. A caul plate 156 is then installed over the skin 50 at step 198. At 200, the composite skin surface is vacuum bagged, and the assembled stiffener assembly 148 and skin 50 are then cured in an autoclave or oven at step 202. At 203, the caul plate 156 is lifted away, and the wing skin panel 48 is de-bagged either by pulling or cutting away the bagging material. At step 205, the assembled cure tool modules 60 are unlocked and may then returned directly to production, in preparation for assembling the next set of the stiffeners 52 by transferring the cure tool modules 60 back to the elevated cure tool assembly table 118. As a result of using the vacuum bag segments 98 which cover the individual cure tool modules 60, it may not be necessary to clean the cure tool modules 60 before they are returned to production, thus speeding up the production process by allowing quick turnaround of tooling and reducing downtime.

Figure 37:
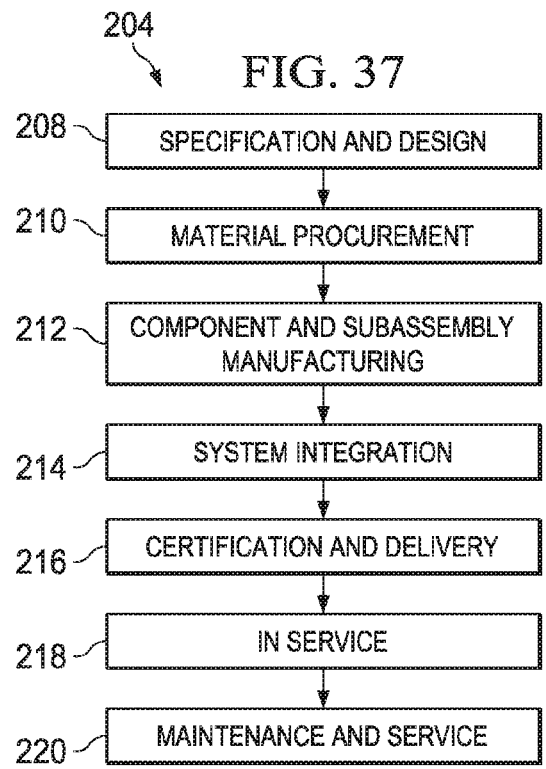
FIG. 37 is an illustration of a flow diagram of aircraft production and service methodology.
Figure 38:
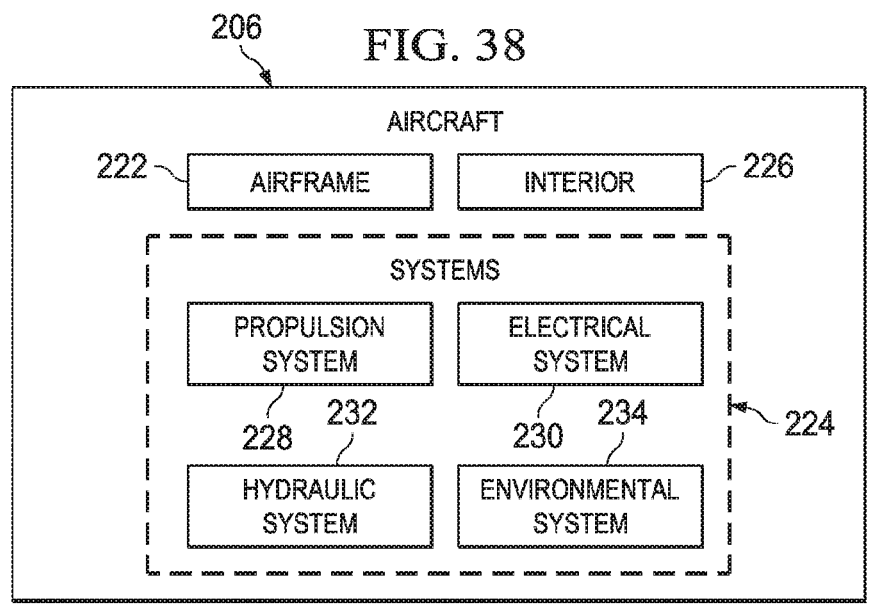
FIG. 38 is illustration of a block diagram of an aircraft.

Embodiments of the disclosure may find use in a variety of potential applications, particularly in the transportation industry, including for example, aerospace, marine, automotive applications and other application where stiffened composite panels may be used. Thus, referring now to FIGS. 37 and 38, embodiments of the disclosure may be used in the context of an aircraft manufacturing and service method 204 as shown in FIG. 37 and an aircraft 206 as shown in FIG. 38. Aircraft applications of the disclosed embodiments may include, for example, without limitation, wings, horizontal stabilizers and vertical stabilizers, to name only a few. During pre-production, exemplary method 204 may include specification and design 208 of the aircraft 206 and material procurement 210. During production, component and sub-assembly manufacturing 212 and system integration 214 of the aircraft 206 takes place. Thereafter, the aircraft 204 may go through certification and delivery 216 in order to be placed in service 218. While in service by a customer, the aircraft 206 is scheduled for routine maintenance and service 220, which may also include modification, reconfiguration, refurbishment, and so on.

Each of the processes of method 204 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 38, the aircraft 206 produced by exemplary method 204 may include an airframe 222 with a plurality of systems 224 and an interior 226. Examples of high-level systems 224 include one or more of a propulsion system 228, an electrical system 230, a hydraulic system 232, and an environmental system 234. Any number of other systems may be included. Although an aerospace example is shown, the principles of the disclosure may be applied to other industries, such as the marine and automotive industries.

Systems and methods embodied herein may be employed during any one or more of the stages of the production and service method 204. For example, components or subassemblies corresponding to production process 212 may be fabricated or manufactured in a manner similar to components or subassemblies produced while the aircraft 206 is in service. Also, one or more apparatus embodiments, method embodiments, or a combination thereof may be utilized during the production stages 212 and 214, for example, by substantially expediting assembly of or reducing the cost of an aircraft 206. Similarly, one or more of apparatus embodiments, method embodiments, or a combination thereof may be utilized while the aircraft 206 is in service, for example and without limitation, to maintenance and service 220.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of fabricating a stiffened composite wing skin, comprising:
   assembling each of a plurality of forming block modules, including, co-linearly arranging and adjusting a plurality of forming block segments;
   producing stiffeners by forming composite pre-preg over each of the forming block modules;
   assembling each of a plurality of cure tool modules on which the stiffeners may be cured, including co-linearly arranging and adjusting a plurality of cure tool segments to match the geometry of the stiffeners, wherein each cure tool segment has a length along a longitudinal axis, wherein the length of each cure tool segment is less than a longitudinal length of the cure tool module and less than a longitudinal length of the composite stiffener;
   transferring the stiffeners from the forming block modules to the cure tool modules;
   assembling a plurality of the stiffeners by placing the cure tool modules side-by-side;
   placing a composite skin on the plurality of the assembled stiffeners; and
   curing the composite skin and the assembled stiffeners.

2. The method of claim 1, further comprising:
   vacuum bagging the assembled stiffeners and the skin, including sealing vacuum bag segments respectively over the cure tool modules.

3. The method of claim 2, further comprising:
   drawing the vacuum bag segments down against the cure tool modules using vacuum lines on the cure tool modules to evacuate the vacuum bag segments.

4. The method of claim 3, wherein co-linearly arranging and adjusting the forming block segments further comprises:
   adjusting the forming block segments to substantially match a contour of the composite skin.

5. The method of claim 1, wherein each forming block module is comprised of at least two forming block segments arranged end-to-end, the method further comprising:
   assembling the plurality of forming block modules by co-linearly arranging the forming block segments, wherein each forming block segment has a length along a longitudinal axis, wherein the length of each forming block segment is less than a longitudinal length of the forming block module, and wherein the length of each forming block segment is less than a longitudinal length of the associated stiffener.

6. The method of claim 1, further comprising:
   adjustably supporting a position of each of the forming block segments with a support assembly.

7. The method of claim 1, further comprising:
   independently adjusting a distance between each of the forming block segments and the support assembly to allow a longitudinal curve in the forming block module.

8. The method of claim 1, further comprising:
   slidably adjusting each of the forming block segments on the support assembly.

9. The method of claim 1, further comprising:
   removably mounting the forming block segments on the support assembly to form the forming block module to a desired length.

10. The method of claim 9, wherein producing the stiffeners further comprises:
    forming the composite pre-preg over an elongate forming surface contoured along the desired length of the forming block module.

11. A method of fabricating a stiffened composite wing skin, comprising:
    assembling a plurality of cure tool modules by co-linearly arranging a plurality of cure tool segments end-to-end, wherein each cure tool module is adapted to have a composite stiffener placed thereon, wherein each cure tool segment is shaped and positioned to match local attributes of the formed composite stiffener, wherein each cure tool segment has a length along a longitudinal axis, wherein the length of each cure tool segment is less than a longitudinal length of the cure tool module and less than a longitudinal length of the composite stiffener;
    individually vacuum bagging the cure tool modules using vacuum bag segments; sealing the vacuum bag segments together;
    placing a composite skin over the composite stiffeners;

placing a caul plate over the composite skin; and,
sealing the vacuum bag segments to the caul plate.

12. The method of claim 11, further comprising:
drawing the vacuum bag segments respectively down against cure tool modules before the composite stiffeners are respectively placed on the cure tool modules.

13. The method of claim 12, further comprising:
curing the composite stiffeners and the skin;
removing the vacuum bag segments from the cure tool modules; and,
returning the cure tool modules to production.

14. The method of claim 11, wherein each of the cure tool segments includes integral vacuum lines, the method further comprising:
drawing the vacuum bag segments respectively down against cure tool modules using the integral vacuum lines.

15. The method of claim 11, further comprising:
assembling a plurality of forming block modules by co-linearly arranging a plurality of forming block segments each adapted for forming a local attribute of an associated composite stiffener;
forming the composite stiffeners by forming composite pre-preg over the plurality of forming block modules;
transferring the formed composite stiffeners to the plurality of cure tool modules; and
curing the composite stiffeners and the skin.

16. The method of claim 15, wherein each forming block module is comprised of at least two forming block segments arranged end-to-end, the method further comprising:
assembling the at least one forming block module by co-linearly arranging the plurality of forming block segments, wherein each forming block segment has a length along a longitudinal axis, wherein the length of each forming block segment is less than a longitudinal length of the forming block module, and wherein the length of each forming block segment is less than a longitudinal length of the composite stiffener.

17. The method of claim 15, further comprising:
adjustably supporting a position of each of the forming block segments with a support assembly.

18. The method of claim 17, further comprising:
independently adjusting a distance between each of the forming block segments and the support assembly to allow a longitudinal curve in the forming block module.

19. The method of claim 17, further comprising:
slidably adjusting each of the forming block segments on the support assembly.

20. The method of claim 17, further comprising:
removably mounting the forming block segments on the support assembly to form the forming block module to a desired length.

21. The method of claim 20, wherein forming the composite stiffener further comprises:
forming the composite pre-preg over an elongate forming surface contoured along the desired length of the forming block module.

\* \* \* \* \*

UNITED STATES PATENT AND TRADEMARK OFFICE
CERTIFICATE OF CORRECTION

PATENT NO. : 9,993,947 B2  
APPLICATION NO. : 15/228973  
DATED : June 12, 2018  
INVENTOR(S) : Hansen Page 1 of 1

It is certified that error appears in the above-identified patent and that said Letters Patent is hereby corrected as shown below:

In the Claims

Column 14, Line 1, change "the at least one forming block module" to --at least one forming block module--

Signed and Sealed this  
Second Day of October, 2018

Andrei Iancu  
*Director of the United States Patent and Trademark Office*